US012578613B2

(12) United States Patent
Kourogi et al.

(10) Patent No.:  US 12,578,613 B2
(45) Date of Patent:  Mar. 17, 2026

(54) OPTICAL FREQUENCY COMB GENERATOR CONTROL DEVICE

(71) Applicant: SUZHOU HYC TECHNOLOGY CO., LTD., Suzhou City (CN)

(72) Inventors: Motonobu Kourogi, Tokyo (JP); Kazuhiro Imai, Tokyo (JP)

(73) Assignee: SUZHOU HYC TECHNOLOGY CO., LTD., Suzhou City (CN)

( * ) Notice: Subject to any disclaimer, the term of this patent is extended or adjusted under 35 U.S.C. 154(b) by 296 days.

(21) Appl. No.: 18/557,242

(22) PCT Filed: Oct. 18, 2021

(86) PCT No.: PCT/JP2021/038411
§ 371 (c)(1),
(2) Date: Oct. 25, 2023

(87) PCT Pub. No.: WO2022/230217
PCT Pub. Date: Nov. 3, 2022

(65) Prior Publication Data
US 2024/0219802 A1      Jul. 4, 2024

(30) Foreign Application Priority Data

Apr. 6, 2021      (JP) ................................. 2021-074337

(51) Int. Cl.
*G02F 1/225*      (2006.01)
*G02F 1/01*      (2006.01)
(52) U.S. Cl.
CPC .......... *G02F 1/2255* (2013.01); *G02F 1/0121* (2013.01); *G02F 2203/055* (2013.01);
(Continued)

(58) Field of Classification Search
CPC ................. G02F 1/2255; G02F 1/0121; G02F 2203/055; G02F 2203/13; G02F 2203/15; G02F 2203/56
See application file for complete search history.

(56) References Cited

U.S. PATENT DOCUMENTS 3,680,011 A * 7/1972 Adams ............... H03H 11/1213
                                                           333/167
5,016,242 A * 5/1991 Tang ................... H04J 14/0298
                                                           398/76
(Continued)

FOREIGN PATENT DOCUMENTS

JP            05268162 A      10/1993
JP            2004077979      3/2004
(Continued)

*Primary Examiner* — Kenneth N Vanderpuye
*Assistant Examiner* — Asif Shameem
(74) *Attorney, Agent, or Firm* — Birch, Stewart, Kolasch & Birch, LLP

(57)      ABSTRACT

A purpose of the present invention is to provide an optical frequency comb generator control device capable of obtaining a stable output by performing a control of a resonator length or a light source frequency such that a control point is located at a position where an optical frequency comb is generated most widely. A carrier frequency component of an optical frequency comb emitted from an optical resonator of an optical frequency comb generator as a transmitted light or a reflected light is attenuated by an optical filter, an optical frequency component extracted via the optical filter is received by a photodetector 6 to detect an optical intensity, and an optical resonant length of the optical resonator or a light source frequency of an incident light is feedback controlled by a resonance control unit by using a detection signal of the photodetector.

6 Claims, 18 Drawing Sheets

(52) U.S. Cl.
CPC ...... *G02F 2203/13* (2013.01); *G02F 2203/15*
(2013.01); *G02F 2203/56* (2013.01)

(56) References Cited

U.S. PATENT DOCUMENTS

| | | | |
|---|---|---|---|
| 6,201,638 | B1 | 3/2001 | Hall et al. |
| 6,570,458 | B2 * | 5/2003 | Cuddy ............... G01R 31/2837 |
| | | | 331/37 |
| 8,982,450 | B2 | 3/2015 | Cox |
| 2014/0185635 | A1 | 7/2014 | Cox et al. |

FOREIGN PATENT DOCUMENTS

| | | | |
|---|---|---|---|
| JP | 3976756 | B | 2/2006 |
| JP | 2006039426 | A * | 2/2006 |
| JP | 2006337832 | A | 12/2006 |
| JP | 3926349 | | 6/2007 |
| JP | 5231883 | B | 7/2013 |
| JP | 2020086137 | | 6/2020 |
| JP | 2020012641 | A | 8/2020 |
| WO | 2018/181213 | | 11/2019 |

* cited by examiner

Modulation signal

No modulation section

F I G. 2

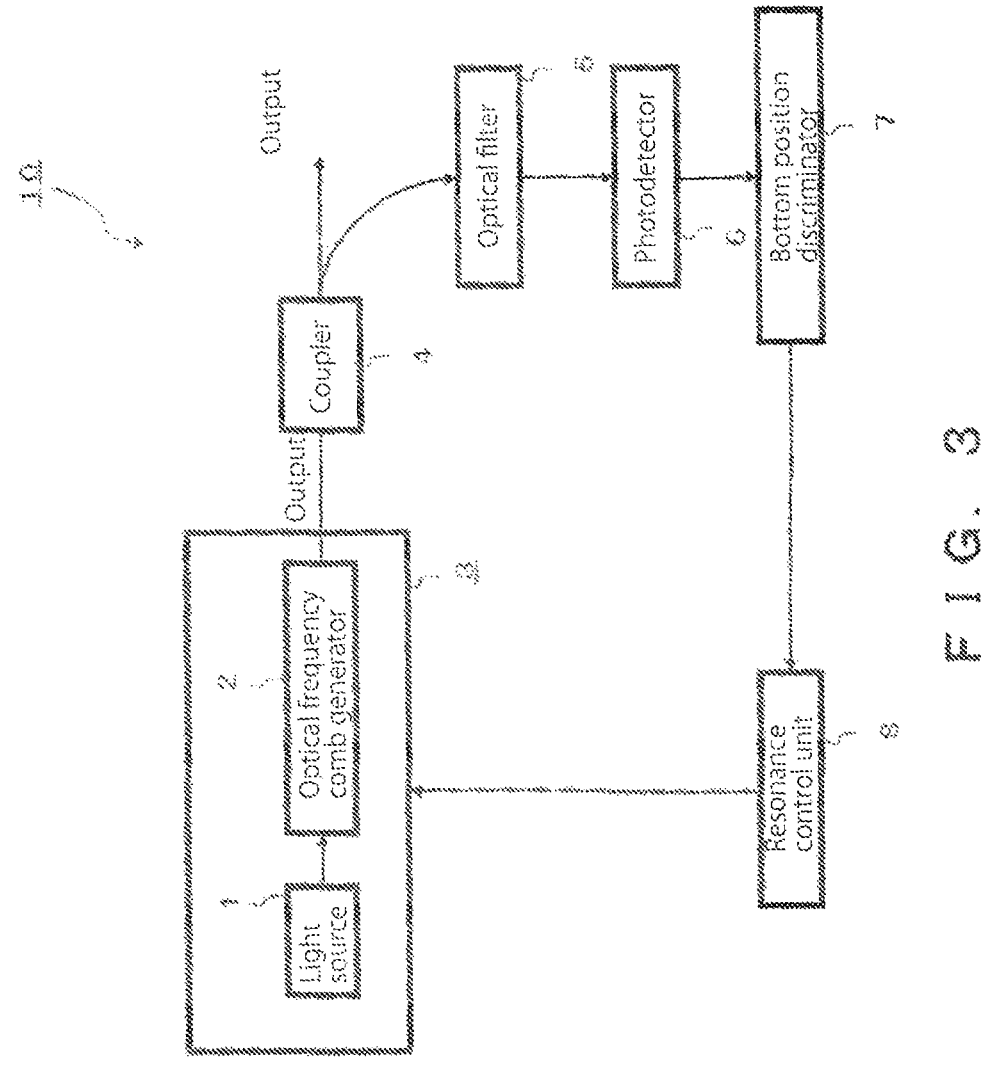
F I G. 3

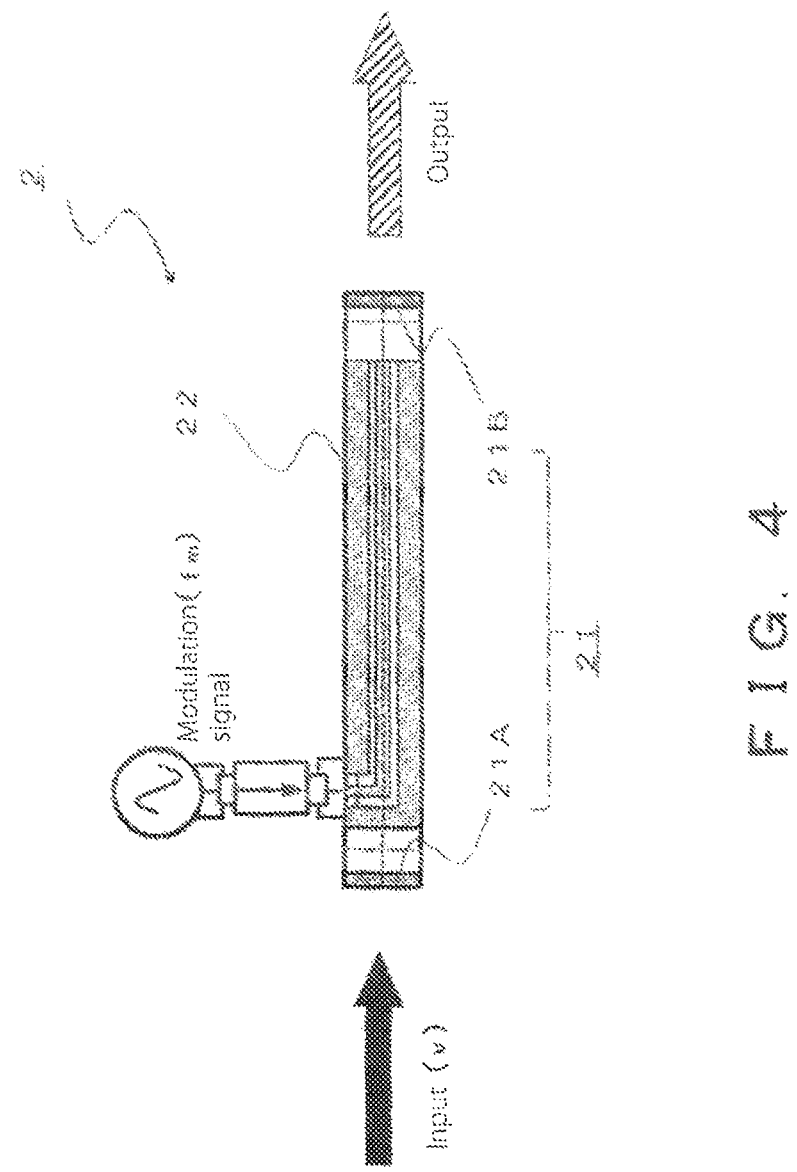
F I G. 4

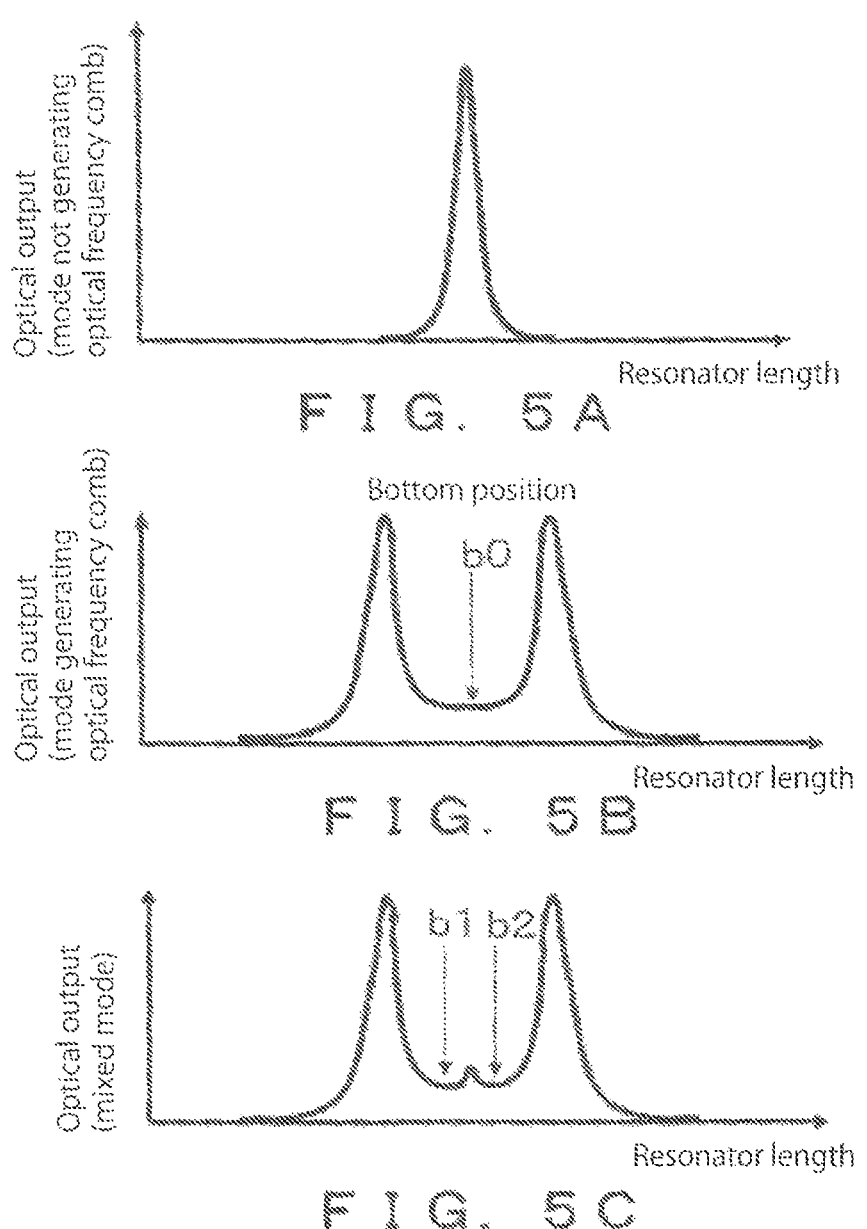
F I G . 5 A
F I G . 5 B
F I G . 5 C

Carrier frequency

F I G.   6 A        Optical spectrum

F I G.   6 B        Remove near carrier
Notch filter

BPF range

F I G.   6 C        Remove near carrier
BPF or HPF or LPF

One bottom position

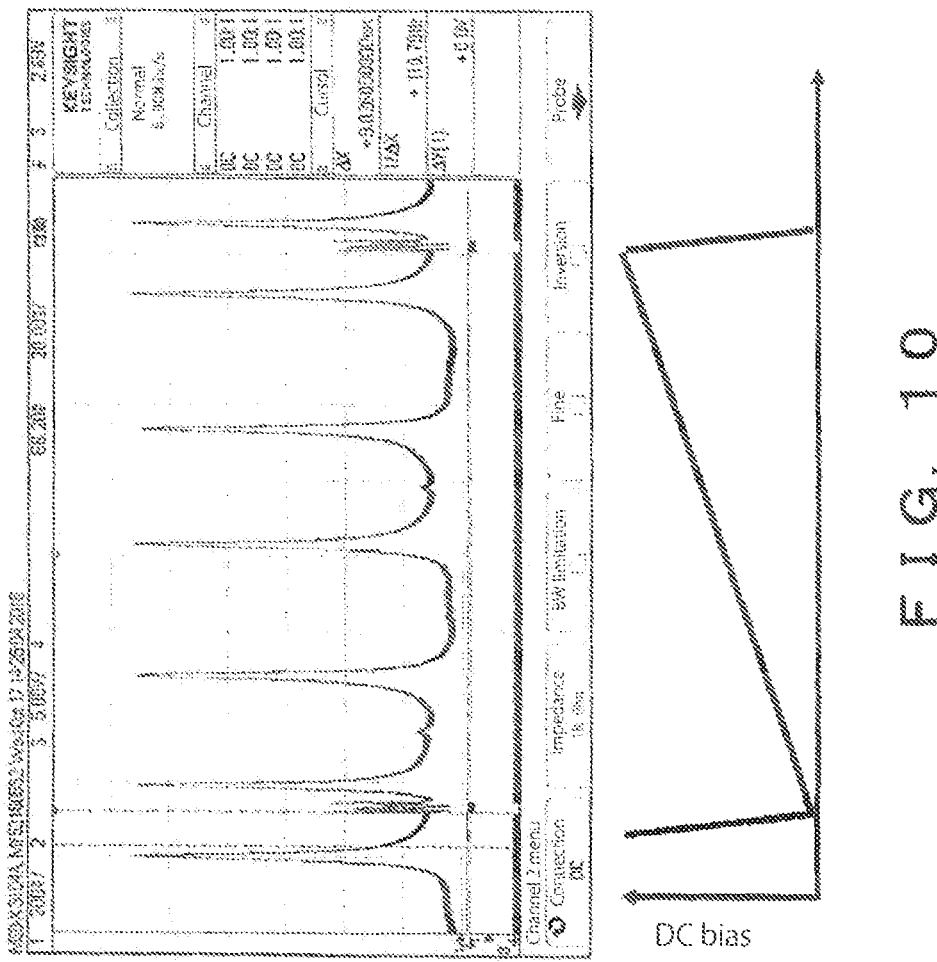
F I G. 10

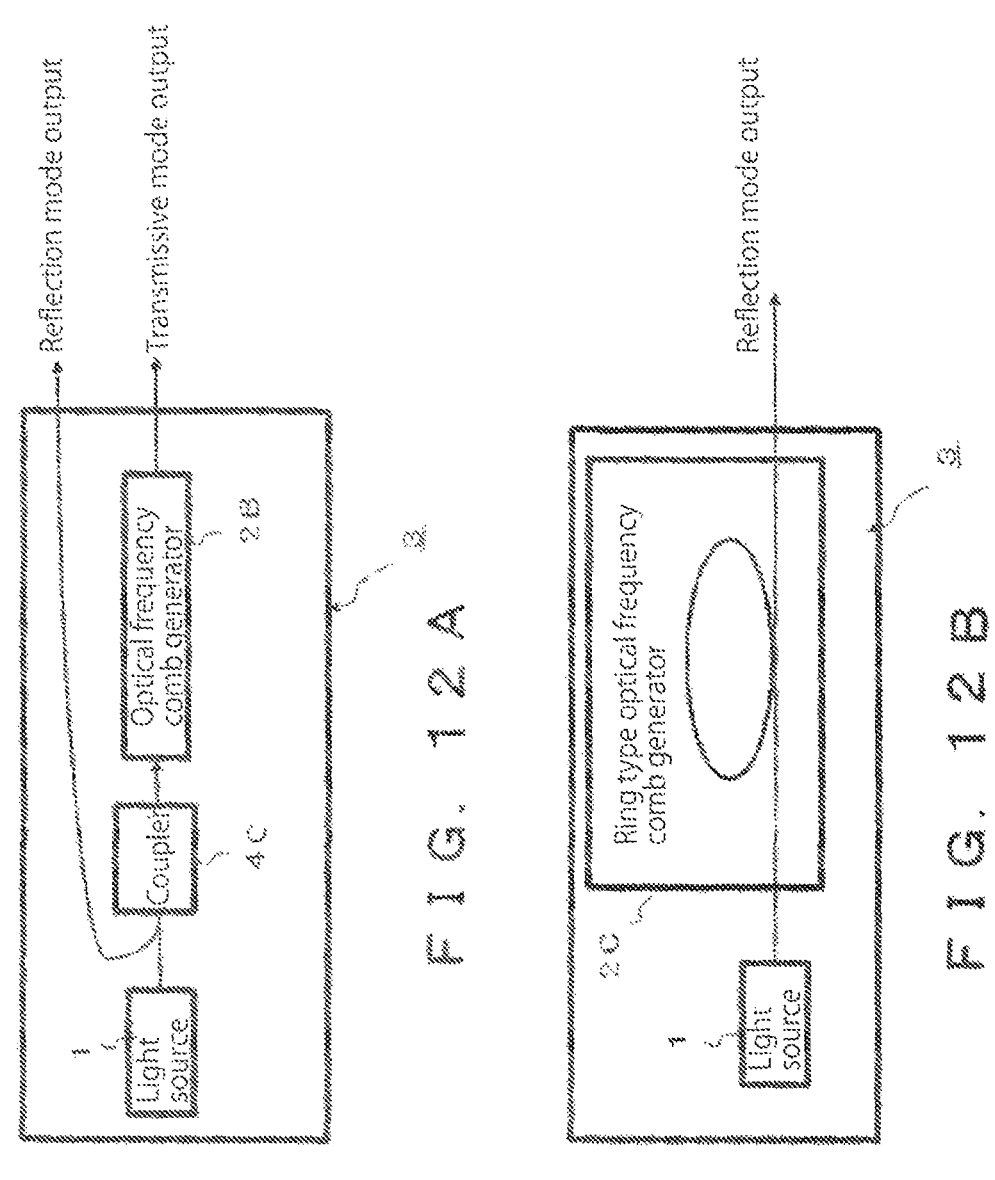
F I G. 1 2 A
F I G. 1 2 B

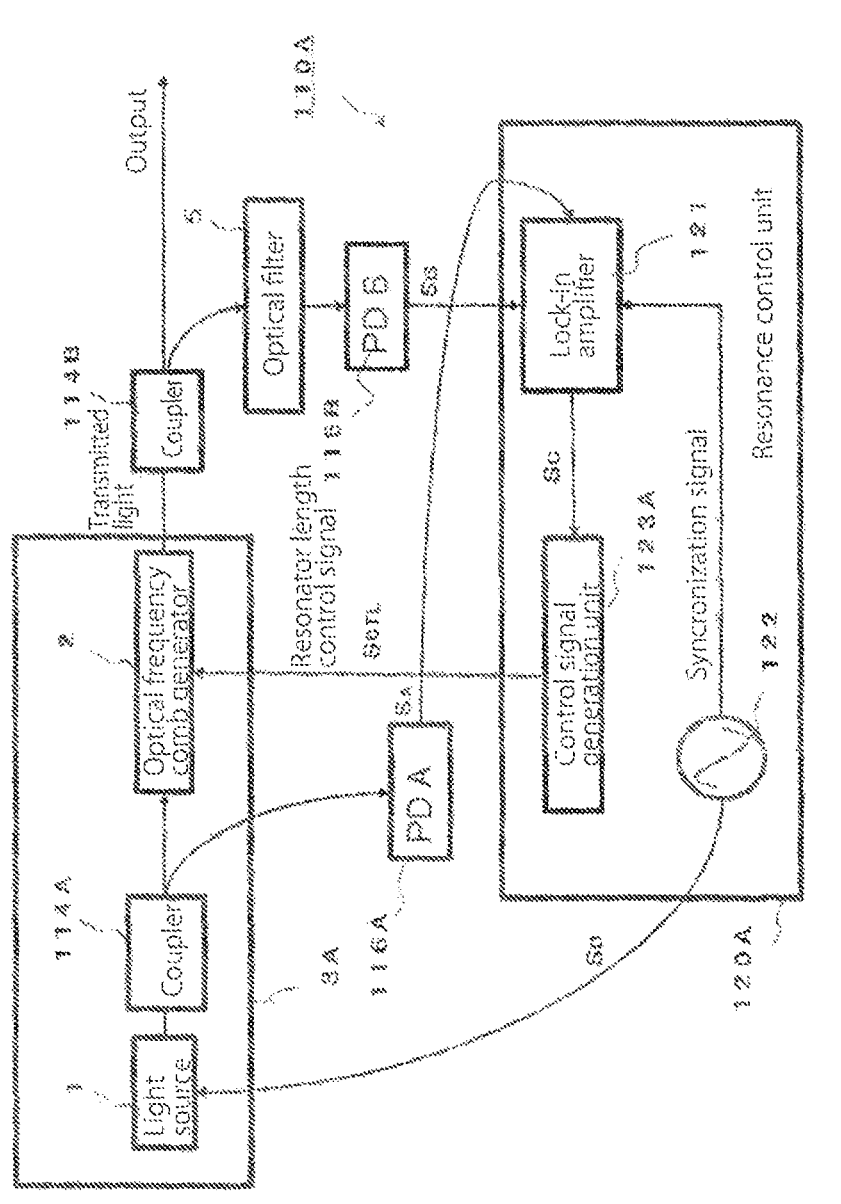
F I G. 1 4

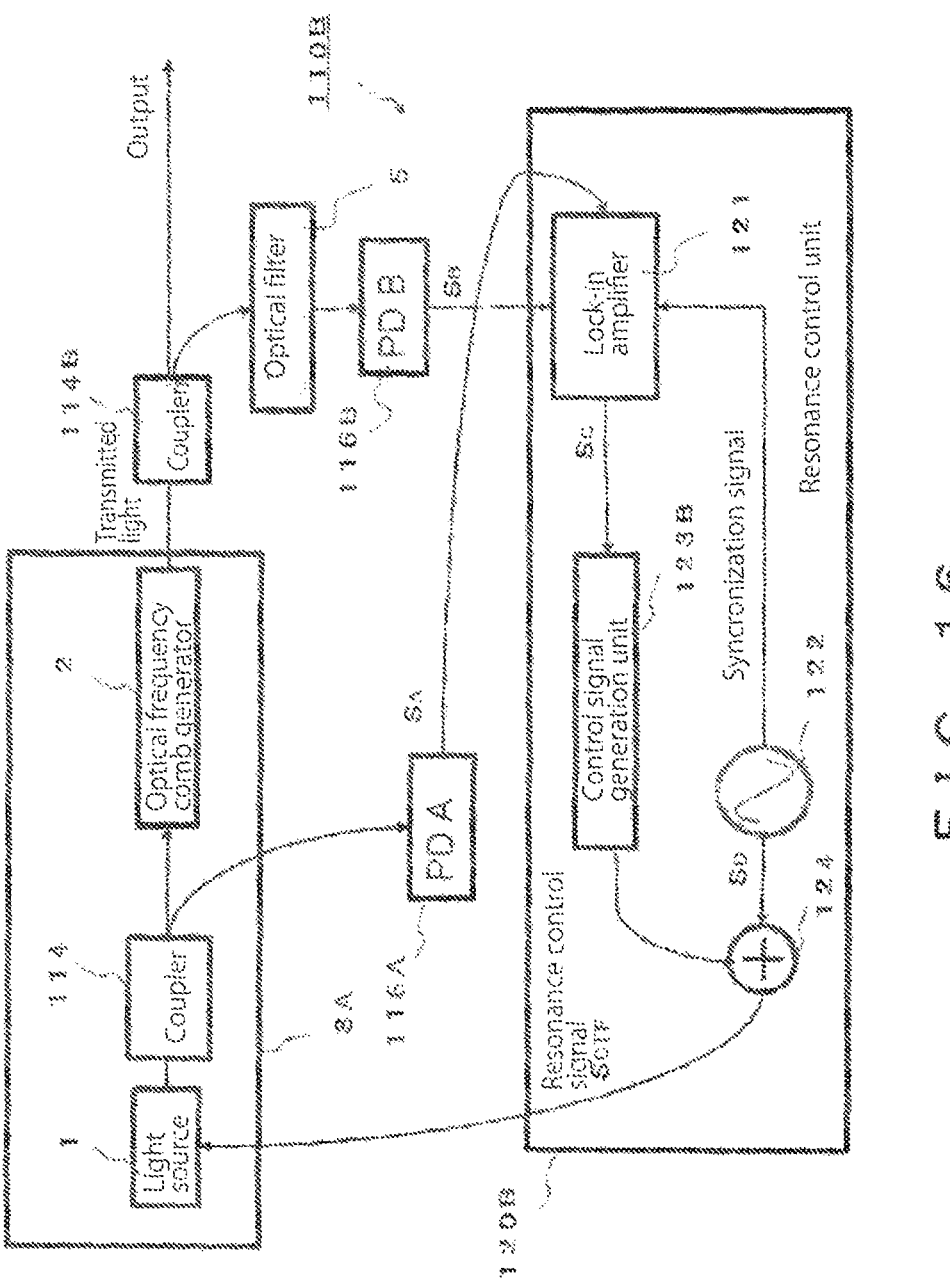
F I G. 16

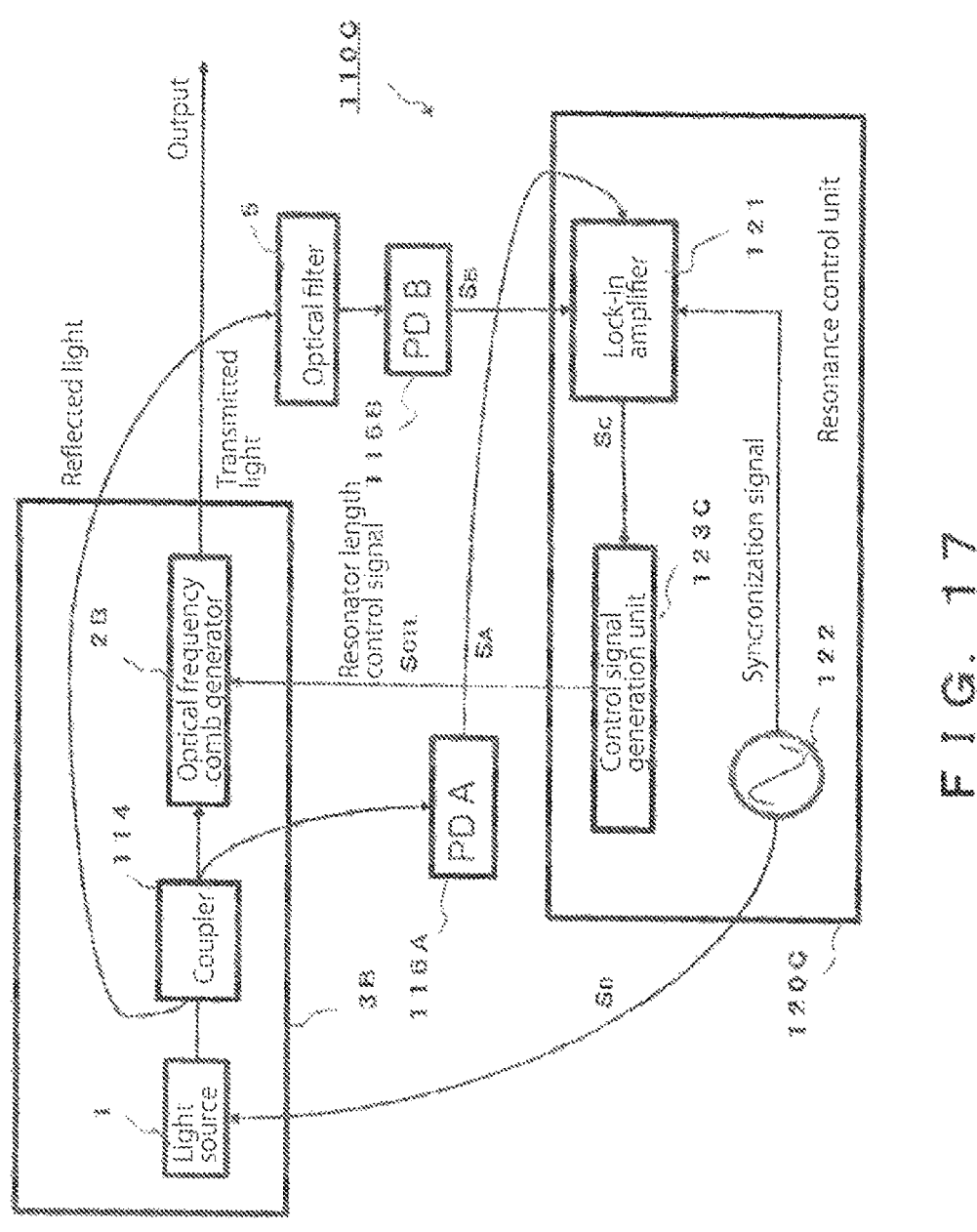
F I G. 1 7

OPTICAL FREQUENCY COMB GENERATOR CONTROL DEVICE

BACKGROUND OF THE INVENTION

Field of the Invention

The present invention relates to an optical frequency comb generator control device used in an optical measurement system or an optical communication system. The present application claims priority based on Japanese Patent Application No. 2021-074337 filed in Japan on Apr. 26, 2021, which is incorporated by reference herein.

Description of Related Art

Conventionally, an optical frequency comb generator is used, for example when measuring an optical frequency with high accuracy. In other words, when measuring a difference frequency by a heterodyne detection of two laser lights, its band is limited by a band of a receiving element, and it is about tens of GHz, so a heterodyne detection system with wide band is built by using an optical frequency comb generator. An optical frequency comb generator generates more than hundreds of sidebands of incident laser light per equal frequency interval, and a frequency stability of generated sidebands is almost equal to a frequency stability of a laser light. Here, by a heterodyne detection of the sidebands and a laser light to be measured, a heterodyne detection system with wide band over several THz or more can be built.

For example by applying to an optical communication, an optical frequency comb can transmit mass data at high speed. Also, by applying an optical frequency comb to a field of a distance measurement, a distance measurement from a unit of micron to a unit of km can be performed with high accuracy.

In an optical frequency comb generator comprising an optical modulator for performing optical modulation of incident light in an optical resonator, a stable optical frequency comb output cannot be obtained when there is a change in a resonator length of an optical resonator.

Here, in order to obtain a stable optical frequency comb output, an intensity of an optical frequency comb output extracted as a transmitted light or a reflected light from an optical frequency comb generator is detected to feedback control a resonator length (for example, refer to Patent Document 1 and Patent Document 2).

Also. the present inventors have previously proposed an optical frequency comb distance meter, comprising two optical frequency comb generators for emitting a reference light and a measuring light with a coherence and mutually different modulation cycles, respectively modulated of its phase or intensity periodically, wherein a reference light detector detects an interference light of a reference light emitted to a reference surface and a measuring light emitted to a measuring surface, and a measuring light detector detects an interference light of the reference light reflected from the reference surface and the measuring light reflected from the measuring surface, wherein the optical frequency comb distance meter is capable of measuring a distance with high accuracy and in short time by calculating a difference between a distance to the reference surface and a distance to the measuring surface from a time difference of two interference signals obtained by the reference light detector and the measuring light detector (for example, refer to Patent Document 3 and Patent Document 4).

In other words, by using a reference light and a measuring light with coherence emitted from two optical frequency comb generators driven by two types of modulation signals with different frequencies, a frequency analysis of an interference signal (hereinafter, referred to as a reference signal) obtained by a reference light detector and an interference signal (hereinafter, referred to as a measuring signal) obtained by a measuring light detector is performed, and a mode number counted from a center frequency of an optical frequency comb is defined as N, a phase difference of N-order mode of the reference signal and the measuring signal is calculated to offset an optical phase difference of an optical frequency comb production and transmission process from the optical frequency comb generators to a reference point, and then, a distance from the reference point to the measuring surface is calculated by determining a phase difference of a reference signal pulse and a measuring signal pulse by calculating an increment of a phase difference per one order in a frequency axis.

Here, a distance measured using a reference light and a measuring light output from two optical frequency comb generators driven by a pair of modulation signals, which are having a frequency difference $\Delta f$ (for example, 500 kHz) and a modulation frequency fm (for example, 25 GHZ) of microwave band, is a remainder of a whole distance (referred to as absolute distance) from a reference point to a measuring surface subtracted by a distance of integral multiples of a half wavelength of a modulation frequency fm. An interference signal is having a periodicity of $\Delta f$, and a phase difference of nearest reference signal and measuring signal is calculated. When measuring a distance beyond a half wavelength, a phase in which $2\pi$ multiplied by an integer is resident as a phase corresponding to a time difference until a comparing reference signal from a reference time. Its integral value cannot be determined by one set of frequency setting. By performing distance measurements plurally by changing fm slightly, its integer can be calculated inversely as a value coinciding with a plurality of measuring conditions.

Patent Document 1: JP 3976756 B
Patent Document 2: JP 2006-337832 A
Patent Document 3: JP 5231883 B
Patent Document 4: JP 2020-12641 A

SUMMARY OF THE INVENTION

In an optical frequency comb generator, an optical frequency comb is generated by coinciding a frequency of an input light with a frequency of any mode of an optical resonator, so in order to generate an optical frequency comb efficiently, it is necessary to control a resonator length for coinciding a frequency of an input light with a frequency of specific mode of an optical resonator.

In the past, a stabilized optical frequency comb output has been obtained by feedback controlling a resonator length by detecting an intensity of an optical frequency comb output extracted from an optical frequency comb generator as a transmitted light or a reflected light, but there are a plurality of resonance modes of an optical resonator in an optical frequency comb generator, and there is a mode (with large input wavelength component) not generating an optical frequency comb, so there was a problem that it is not possible to stabilize an optical frequency comb output in this mode.

For example, in the case of an electrooptical modulator type, there are two modes (TE, TM mode or the like) with different polarization in an optical resonator. In a polarization mode (one is selected) for generating an optical frequency comb, FSR is set to integral divisions of a modulation frequency, and an electrooptical constant is large and a generation efficiency of an optical frequency comb is high. However, FSR will be different in other polarization mode, and also, an electrooptical constant will be different, so it will not be an optical frequency comb with large frequency range.

In the case of an optical frequency comb generator using an electrooptical effect, in a polarization mode other than a main mode, FSR will be different as an equivalent refractive index is different, and also, an electrooptical constant will be small. Therefore, in a mode other than a main polarization mode, an optical frequency comb is hardly generated, and even when it is generated a little, a carrier component will be a main component. A mode other than a main polarization mode is removed by a polarizer or the like, but by a limitation of an extinction ratio of a polarizer or by an assembling accuracy, it may be mixed in an output light and provide bad influence in a control of a resonator length. This is affected by that a resonance frequency of a polarization mode which is not a main mode cannot be controlled relatively with respect to a resonance frequency of a main mode.

Also, same applies when there is a transverse mode, and it may be mixed in an output light and provide bad influence in a control of a resonator length. This occurs when a generation method of an optical frequency comb is not a complete single mode, and it cannot be avoided even by a generation method of an optical frequency comb other than an electrooptical effect.

Here, FIG. 1 is a characteristic chart plotting an output light intensity when a resonator length is swept by a DC bias via a bias T of a modulation input of an optical frequency comb module. A place where polarization modes are overlapped is indicated by a circle mark in FIG. 1. In FIG. 1, a plurality of modes are generating an optical frequency comb, and there are modes without a problem, but a distortion can be seen at a circle mark. Polarization modes are different in an electrooptical constant, and it cannot be predicted whether it overlaps with a mode. Also, it is affected by an environmental change or a frequency change of a little input light. A shape is also not stable, by an influence by an interference with a carrier of an optical frequency comb. Therefore, a device mixed with such modes cannot be used in a product, and a yield of a product will be deteriorated.

As described in the above, in an optical frequency comb generation in an optical frequency comb generator using a waveguide type optical resonator for resonating a light confined in an optical waveguide, an orthogonal polarization component may destabilize a control for coinciding a resonance frequency of an optical frequency comb generator with a laser frequency, and it will be a cause for a deviation of a control point, an oscillation of a control, or the like, and when using an optical frequency comb for example to a measuring device for measuring a height or a distance to an object to be measured, an orthogonal polarization component has been a cause for an measurement error.

Also, when using an optical frequency comb distance meter as an absolute distance meter, an ambiguity of a distance of integral multiples of a half wavelength has been resolved by calculating a distance of integral multiples of a half wavelength from a change of phase of an interference signal, by switching modulation frequencies of an optical frequency comb generator in a state that an object to be measured is fixed, but there was a problem that an ambiguity cannot be resolved sufficiently when a switching takes time.

In other words, during a switching of modulation frequencies, if it is affected by an oscillation or a change in refractive index of air, it will be difficult to determine whether a phase difference by a switching of modulation frequencies is measured or it is added by an oscillation or a change in refractive index.

Therefore, it is important that a switching of modulation frequencies is performed as quickly as possible in a short time. A microwave switch is used for a switching of modulation frequencies, a transition of a switching is in short time (about 30 ns), but as illustrated in FIG. 2, it may happen that a modulation signal is not output, or it may happen that a deviation of modulation frequencies is large even in a short time.

Figure 2:
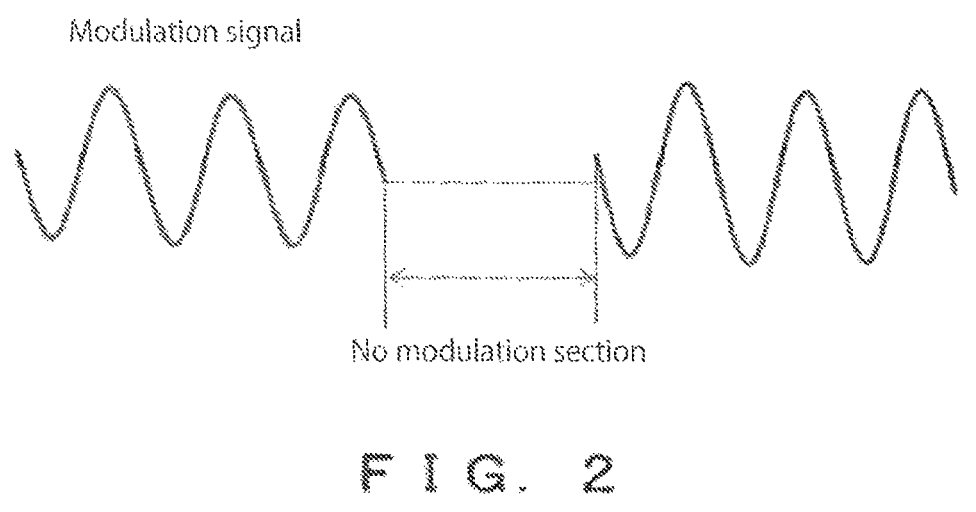

FIG. 2 is a waveform chart illustrating a modulation signal having no modulation section occurring when switching modulation frequencies of an optical frequency comb generator.

When a modulation signal is not output, an input light will not be modulated at that moment, so it will not be a light in comb shape, and a light with an input wavelength as a main component is output.

Also, when a deviation of modulation frequencies is large, due to a fact that a structure of an electrode or an optical resonator of an optical frequency comb generator is designed such that an efficiency of a modulation will be high with respect to a specific modulation frequency, a modulation efficiency will be low with respect to a deviated frequency, as a result, a light with an input wavelength as a main component is output.

Compared to a power of a modulated sideband (optical frequency comb other than input wavelength), an output wavelength power of a state with no modulation or with weak modulation is high, so its influence is large even if it is a phenomenon in short time.

In addition, in a technology disclosed in Patent Document 1, in an optical frequency comb generator comprising an optical modulator comprised of electrooptical crystal for transmitting a light to be modulated in an optical resonator, an optical resonant length of the optical resonator is feedback controlled based on a detection signal of a photodetector for detecting an optical intensity by receiving an optical frequency component extracted by an optical filter from an optical frequency comb emitted from the electrooptical crystal. However, the optical filter is for extracting an optical frequency component near an edge where the optical frequency comb attenuates drastically departed from a center frequency of the optical frequency comb, and it will not attenuate a carrier component of a center frequency.

Here, considering the above conventional circumstances, a purpose of the present invention is to provide an optical frequency comb generator control device capable of obtaining a stable output by performing a control of a light source frequency or a resonator length such that a control point is located at a position where an optical frequency comb is generated most widely, even when a generation method of an optical frequency comb is not a complete single mode.

Also, other purpose of the present invention is to provide an optical frequency comb generator control device capable of obtaining a stable output by performing a control of a light source frequency or a resonator length such that a control point is located at a position where an optical frequency comb is generated most widely, even in an optical frequency comb generator in which a modulation frequency is switched.

Other purpose of the present invention, and concrete advantages obtained by the present invention will be clearer from an explanation of embodiments explained in below.

In the present invention, an optical frequency comb is stabilized by feedback controlling a light source frequency of incident light or an optical resonant length of an optical resonator by detecting an optical intensity of an optical frequency component extracted via an optical filter for attenuating a carrier frequency component of an optical frequency comb emitted from an optical frequency comb generator comprising an optical modulator for performing an optical modulation of incident light in an optical resonator.

In other words, the present invention is a control device of an optical frequency comb generator comprising an optical modulator for performing an optical modulation of incident light in an optical resonator, the optical frequency comb generator control device comprising: an optical filter for attenuating a carrier frequency component of an optical frequency comb emitted as a transmitted light or a reflected light from the optical resonator; a photodetector for detecting an optical intensity by receiving an optical frequency component extracted from the optical frequency comb via the optical filter; and a resonance control unit to which a detection signal of the photodetector is supplied, wherein an optical intensity of the optical frequency comb in which the carrier frequency component is attenuated by the optical filter is detected by the photodetector, and an optical resonant length of the optical resonator or a light source frequency of the incident light is feedback controlled by the resonance control unit.

The optical frequency comb generator control device relating to the present invention comprises a bottom position discriminator for discriminating a bottom position of a signal level of the detection signal of the photodetector, wherein the resonance control unit performs a feedback control with the bottom position of the signal level of the detection signal of the photodetector as a stabilization point, based on a discrimination output by the bottom position discriminator.

Also, in the optical frequency comb generator control device relating to the present invention, a plurality of modulation signals with different modulation frequencies are switched and supplied to the optical modulator.

Also, in the optical frequency comb generator control device relating to the present invention, the optical filter is a notch filter for attenuating the carrier frequency component of the optical frequency comb.

Also, in the optical frequency comb generator control device relating to the present invention, the optical filter is a high pass filter having a cutoff frequency near the carrier frequency component of the optical frequency comb.

Also, in the optical frequency comb generator control device relating to the present invention, the optical filter is a low pass filter having a cutoff frequency near the carrier frequency component of the optical frequency comb.

Also, in the optical frequency comb generator control device relating to the present invention, the optical filter is a band pass filter having one cutoff frequency near the carrier frequency component of the optical frequency comb.

In the optical frequency comb generator control device relating to the present invention, an optical frequency comb is stabilized by feedback controlling an optical resonance length of an optical resonator by detecting an optical intensity of an optical frequency component extracted via an optical filter for attenuating a carrier frequency component of an optical frequency comb emitted from an optical frequency comb generator comprising an optical modulator for performing an optical modulation of incident light in an optical resonator, so an optical frequency comb generator control device capable of obtaining a stable output by performing a control of a resonator length such that a control point is located at a position where an optical frequency comb is generated most widely, even when a generation method of an optical frequency comb is not a complete single mode, is provided.

Also, in the present invention, an optical frequency comb is stabilized by feedback controlling an optical resonance length of an optical resonator by detecting an optical intensity of an optical frequency component extracted via an optical filter for attenuating a carrier frequency component of an optical frequency comb emitted from an optical frequency comb generator comprising an optical modulator for performing an optical modulation of incident light in an optical resonator, so an optical frequency comb generator control device capable of obtaining a stable output by performing a control of a resonator length such that a control point is located at a position where an optical frequency comb is generated most widely, even in an optical frequency comb generator in which a modulation frequency is switched, is provided.

BRIEF DESCRIPTION OF THE DRAWINGS

FIG. 2 is a waveform chart illustrating a modulation signal having no modulation section occurring when switching modulation frequencies of an optical frequency comb generator.

FIG. 3 is a block diagram illustrating a basic structure of an optical frequency comb generator control device applying the present invention to an optical frequency comb generation device.

FIG. 4 is a sectional view schematically illustrating a structure of an optical frequency comb generator comprised in the optical frequency comb generation device.

FIG. 5(A), FIG. 5(B), and FIG. 5(C) are characteristic charts plotting a transmitted light power of an optical frequency comb generator obtained by sweeping a resonator length in the optical frequency comb generator, and FIG. 5(A) illustrates an optical output of a mode not generating an optical frequency comb, FIG. 5(B) illustrates an optical output of a mode operating as an optical frequency comb, FIG. 5(C) illustrates an optical output when respective modes are mixed.

FIG. 6(A) illustrates a spectrum of an optical output when respective modes are mixed, FIG. 6(B) illustrates a spectrum of an optical output when a periphery of a carrier is removed by a notch filter, FIG. 6(C) illustrates a spectrum of an optical output when a periphery of a carrier is removed by a band pass filter, a high pass filter, or a low pass filter.

FIG. 10 is a view illustrating an observation result of a detection signal obtained by a photodetector receiving an optical frequency comb output in a state without inserting an optical filter by driving an optical frequency comb generator by the driving signal.

FIG. 12(A) and FIG. 12(B) are block diagrams schematically illustrating examples of an optical frequency comb generation device, and FIG. 12(A) illustrates an optical frequency comb generation device comprising an optical frequency comb generator in which an optical frequency comb is extracted as a reflected light, FIG. 12(B) illustrates an optical frequency comb generation device comprising a ring type optical frequency comb generator.

FIG. 13(A) illustrates a characteristic of an optical output power of a reflection mode of an optical frequency comb generator, FIG. 13(B) illustrates a characteristic of an optical output power of the reflection mode in which a carrier component is removed by an optical filter.

FIG. 14 is a block diagram illustrating an example of an optical frequency comb generator control device in which an optical frequency comb resonator length is controlled using an optical frequency comb emitted from an optical frequency comb generator as a transmitted light.

FIG. 15(A) illustrates a signal, in which a transmitted light intensity when a resonator length or a laser frequency is changed, is standardized by a power of an input light, FIG. 15(B) illustrates a differential signal of the standardized optical intensity signal.

FIG. 16 is a block diagram illustrating other example of an optical frequency comb generator control device in which an optical frequency comb resonator length is controlled using an optical frequency comb emitted from an optical frequency comb generator as a transmitted light.

FIG. 17 is a block diagram illustrating an example of an optical frequency comb generator control device in which an optical frequency comb resonator length is controlled using an optical frequency comb emitted from an optical frequency comb generator as a reflected light.

DETAILED DESCRIPTION OF THE INVENTION

Figure 1:
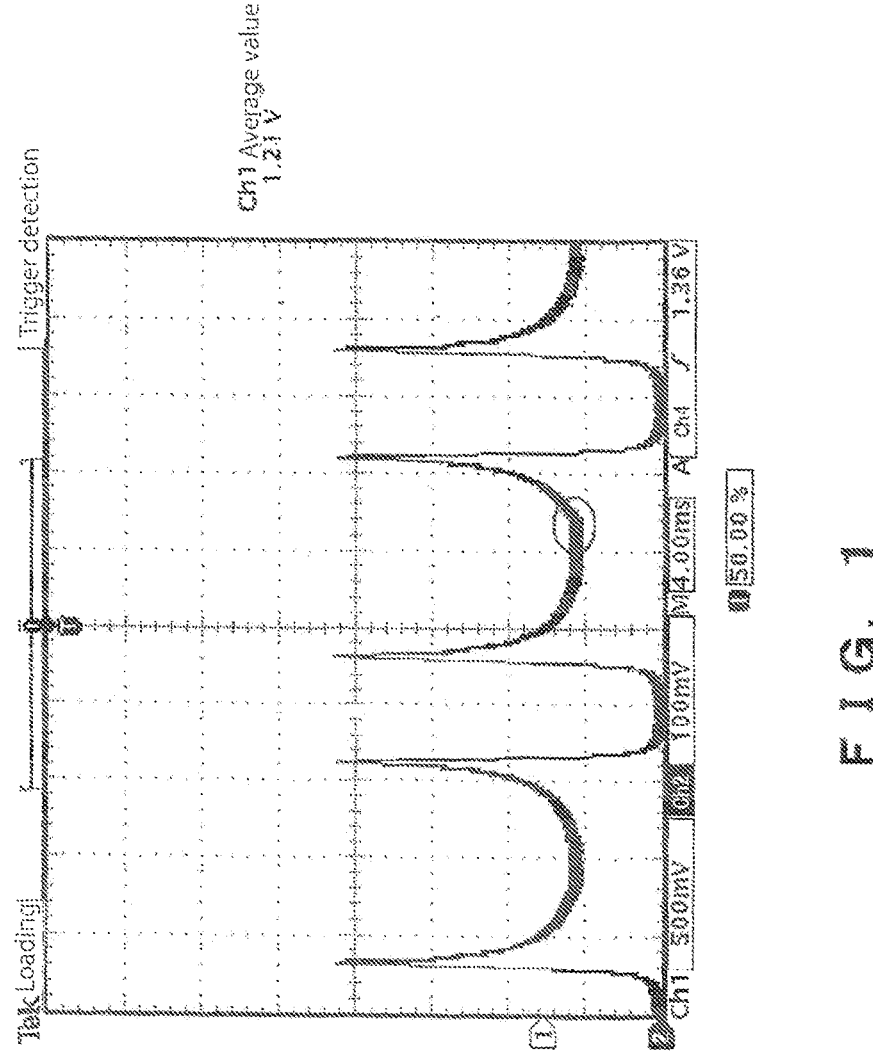
FIG. 1 is a characteristic chart plotting an output light intensity when a resonator length is swept by a DC bias via a bias T of a modulation input of an optical frequency comb module.

Hereinafter, explaining in detail about preferred embodiments of the present invention, with reference to the drawings. In addition, about common components, it is explained by giving common reference number in the drawings. Also, the present invention should not be limited to the following examples, it goes without saying that it can be changed optionally within a scope not deviating from a gist of the present invention.

As a basic structure of an optical frequency comb generator control device 10 applying the present invention is illustrated in a block diagram of FIG. 3, the present invention is applied to an optical frequency comb generation device 3 comprising an optical frequency comb generator 2 for generating an optical frequency comb by performing an optical modulation of an incident light input from a light source 1.

For example as illustrated in FIG. 4, the optical frequency comb generator 2 is configured by inserting an optical phase modulator 22 in an optical resonator 21 composed of a pair of reflecting mirrors 21A, 21B, and when the optical phase modulator 22 is driven by a frequency coinciding with integral multiples of a free spectrum region (FSR) of the optical resonator 21 by inputting a light of continuous wave of a single frequency, a modulation signal cycle and a cycle of multiple round trips in the optical resonator 21 will be synchronized, so extremely efficient modulation is performed compared to an optical phase modulator without a resonator, a number of sidebands will reach hundreds to thousands, and an optical frequency comb having a spectrum width of several terahertz can be obtained as an output. In the optical frequency comb generator 2, a pulse which is short in time can be generated, and an optical pulse with a time width of one picosecond or less can be generated. An output of the optical frequency comb generator 2 is a light in comb shape in which a center frequency is equal to an input frequency and a frequency interval is equal to a modulation frequency, and in a time axis, it is a pulse train in which a modulation frequency is a repetition frequency. A pulse with shorter time width can be obtained as a spectrum width becomes greater by increasing a modulation index.

In other words, the optical frequency comb generator control device 10 is a control device of the optical frequency comb generator 2 comprising an optical modulator for performing an optical modulation of incident light in the optical resonator 21, comprising: an optical filter 5 to which a part of an optical frequency comb emitted from the optical resonator 21 as a transmitted light or a reflected light and branched by a coupler 4 such as an optical coupler or a circulator is entered; a photodetector 6 for detecting an optical intensity by receiving the part of the optical frequency comb via the optical filter 5; and a resonance control unit 8 to which a detection signal of the photodetector 6 is supplied, wherein an optical resonant length of the optical resonator 21 or a light source frequency of the incident light is feedback controlled by the resonance control unit 8.

The optical filter 5 comprised in the optical frequency comb generator control device 10 is having an optical characteristic to attenuate a carrier frequency component of an optical frequency comb entering via the coupler 4.

Here, FIG. 5(A), FIG. 5(B), and FIG. 5(C) are characteristic charts plotting a transmitted light power of an optical frequency comb generator obtained by sweeping a resonator length in the optical frequency comb generator 2. In the optical frequency comb generator 2, an optical frequency comb generation mode of the optical resonator 21 generating an optical frequency comb is only a specific mode, and as a schematic view when plotting a transmitted light power of a mode not generating an optical frequency comb by sweeping a resonator length are illustrated in FIG. 5(A), a main component of a transmitted light power of a mode not generating an optical frequency comb is a carrier frequency component which is a center frequency of an incident light, on the other hand, as a schematic view when plotting a transmitted light power of a mode operating as an optical frequency comb by sweeping a resonator length are illustrated in FIG. 5(B), in a mode operating as an optical frequency comb, an optical frequency comb can be generated over a widest range by controlling a resonator length to be at a bottom position b0 between two peaks existing at both sides of a center frequency. However, when the mode not generating an optical frequency comb and the mode operating as an optical frequency comb are mixed, as a schematic view when plotting a transmitted light power of the mixed mode by sweeping a resonator length are illustrated in FIG. 5(C), a plurality of bottom positions b1, b2 exist between two peaks, and a stable optical frequency comb cannot be obtained as there will be plural control points of a resonator length.

Figure 6:
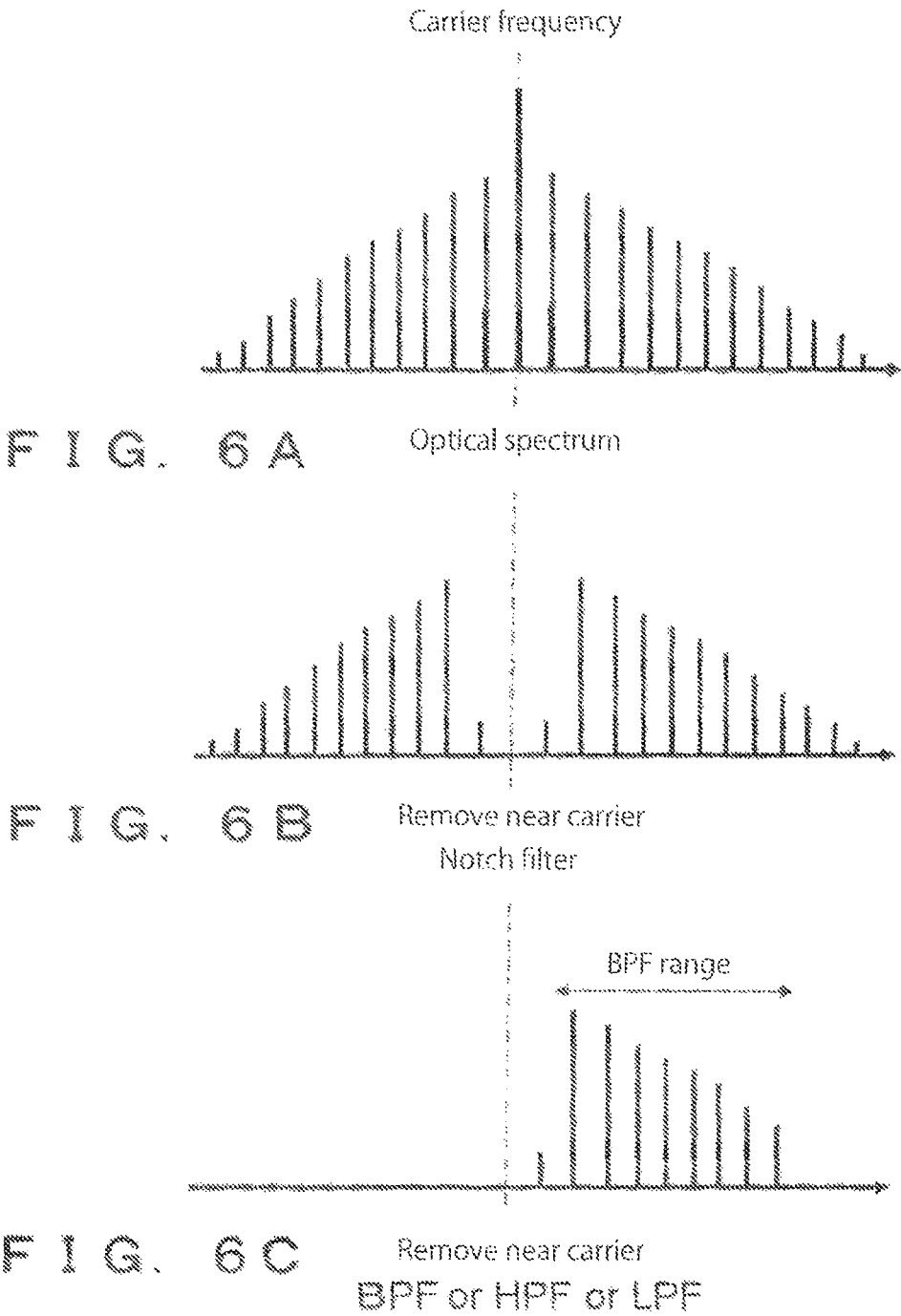
FIG. 6(A), FIG. 6(B), and FIG. 6(C) are spectral graphs illustrating a spectrum of an optical output obtained via an optical filter and a spectrum of an optical output of the optical frequency comb generator.

FIG. 6(A), FIG. 6(B), and FIG. 6(C) are spectral graphs illustrating a spectrum of an optical output obtained via the optical filter 5 and a spectrum of an optical output of the optical frequency comb generator 2. In other words, when the mode not generating an optical frequency comb and the mode operating as an optical frequency comb are mixed, as illustrated in a bold line in FIG. 6(A), in a spectrum of an optical frequency comb emitted from the optical frequency comb generator 2, there will be a vicinity component of a carrier frequency near no modulation state in the mode not generating an optical frequency comb, but in the optical frequency comb generator control device 10, for example by using a notch filter as the optical filter 5, as illustrated in FIG. 6(B), the vicinity component of the carrier frequency can be removed.

Also, by using a high pass filter, a low pass filter, or a band pass filter as the optical filter 5, as illustrated in FIG. 6(C), a one side sideband component may be removed together with the carrier frequency.

In other words, the optical filter 5 comprised in the optical frequency comb generator control device 10 may be a notch filter for attenuating the carrier frequency component of the optical frequency comb.

Also, the optical filter 5 may be a high pass filter having a cutoff frequency near the carrier frequency component of the optical frequency comb.

Also, the optical filter 5 may be a low pass filter having a cutoff frequency near the carrier frequency component of the optical frequency comb.

Further, the optical filter 5 may be a band pass filter having one cutoff frequency near the carrier frequency component of the optical frequency comb.

Figure 7:
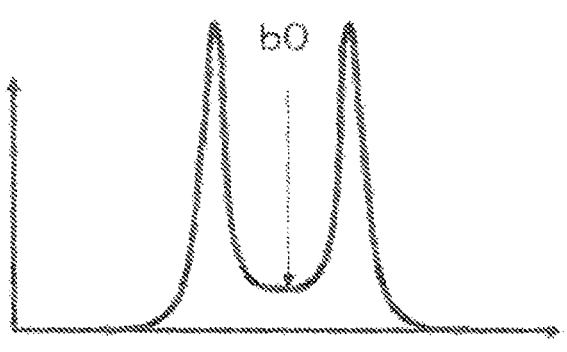
FIG. 7 is a characteristic chart plotting a transmitted light power obtained from the optical frequency comb generator via an optical filter, when a resonator length is swept.

In the optical frequency comb generator control device 10, by the photodetector 6 for receiving a part of an incident optical frequency comb via the optical filter having an optical characteristic to attenuate a carrier frequency component of the incident optical frequency comb, an optical intensity of an optical frequency comb in which the carrier frequency component is attenuated is detected, so even when the mode not generating an optical frequency comb and the mode operating as an optical frequency comb are mixed, there will be no plural bottoms between two peaks in a detection signal of the photodetector 6, and as illustrated in FIG. 7, there will be one bottom position b0, so by feedback controlling an optical resonant length of the optical resonator 21 or a light source frequency of the incident light by the resonance control unit 8, by using the detection signal of the photodetector 6, a stable optical frequency comb can be emitted from the optical frequency comb generator 2.

In addition, the optical frequency comb generator control device 10 comprises a bottom position discriminator 7 for discriminating a bottom position of a signal level of a detection signal of the photodetector 6, and the resonance control unit 8 performs a feedback control with the bottom position b0 of the signal level of the detection signal of the photodetector 6 as a stabilization point, based on a discrimination output by the bottom position discriminator 7.

In this way, in the optical frequency comb generator control device 10, even when the mode not generating an optical frequency comb and the mode operating as an optical frequency comb are mixed, a stable optical frequency comb can be obtained from the optical frequency comb generator 2 by feedback controlling an optical resonant length of the optical resonator 21 or a light source frequency of the incident light by the resonance control unit 8, by using the detection signal of the photodetector 6, so for example by applying to an optical frequency comb distance meter for performing an absolute distance measurement by switching respective modulation frequencies of two optical frequency comb generators, an absolute distance measurement can be performed by using stable two types of optical frequency combs by eliminating a disturbance of a control of a resonator length by an influence during no modulation period occurring when switching modulation frequencies.

Figure 8:
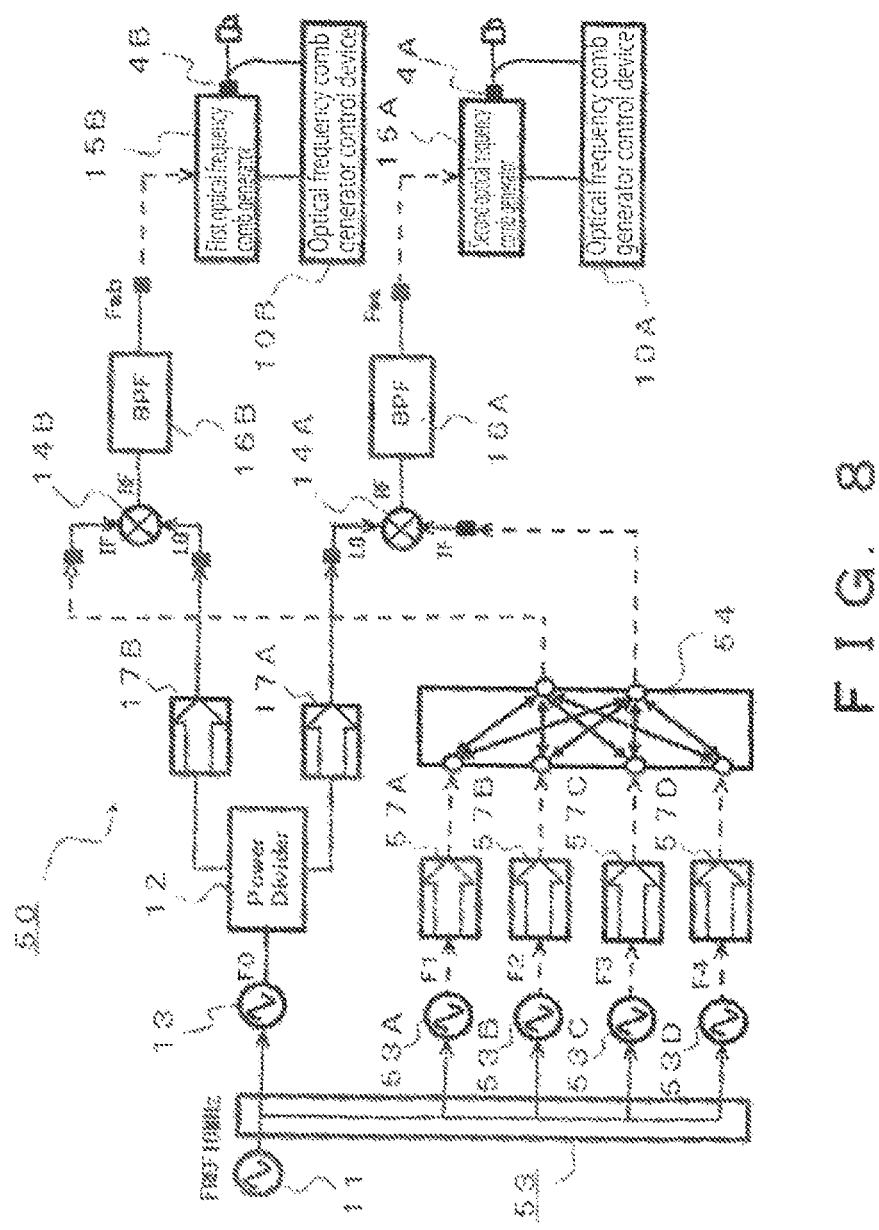
FIG. 8 is a block diagram illustrating an example of an optical frequency comb generation device comprising two optical frequency comb generators used for an optical frequency comb distance meter for performing an absolute distance measurement applying an optical frequency comb generator control device relating to the present invention.

FIG. 8 is a block diagram illustrating a structure of an optical frequency comb generation device 50 comprising two optical frequency comb generators 15A, 15B used for an optical frequency comb distance meter for performing an absolute distance measurement.

In this optical frequency comb generation device 50, by inputting four types of frequency signals output from a synthesizer circuit 53 by cyclically switching the frequency signals via a switching circuit 54, two types of frequency signals with different cycles to each other in which modulation cycles are switched cyclically are supplied to first and second frequency converters 14A, 14B.

The optical frequency comb generation device 50 comprises: a synthesizer circuit 53 for outputting four independent frequency signals (F1: 1000 MHz, F2: 1010 MHZ, F3: 1000.5 MHz, F4: 1010.5 MHz) for example with a difference frequency of 500 kHz; and a switching circuit 54 with four inputs and two outputs to which four frequency signals are input from the synthesizer circuit 53 respectively via isolators 57A, 57B, 57C, 57D, and the first and second frequency converters 14A, 14B are connected to two output terminals of the switching circuit 54.

In the optical frequency comb generation device 50, a first oscillator 13 supplies a frequency signal of a frequency F0 (for example, 24 GHz), in which an oscillation frequency is fixed by phase-locked to a reference frequency signal $F_{REF}$ supplied from a reference oscillator 11 via a power divider 52 with five branches, to the first and second frequency converters 14A, 14B via a power divider 12 with two branches and isolators 17A, 17B.

The synthesizer circuit 53 comprises four oscillators 53A, 53B, 53C, 53D for generating frequency signals with four types of frequencies F1, F2, F3, F4 different to each other in which frequencies are fixed by respectively phase-locked to the reference frequency signal $F_{REF}$ supplied from the reference oscillator 11 via the power divider 52 with five branches.

A first oscillator 53A generates a first frequency signal fixed to a first frequency F1 (1000 MHz) phase-locked by a PLL circuit to the reference frequency signal $F_{REF}$ generated by the reference oscillator 11.

Also, a second oscillator 53B generates a second frequency signal fixed to a second frequency F2 (1010 MHZ) phase-locked by the PLL circuit to the reference frequency signal $F_{REF}$ generated by the reference oscillator 11.

Also, a third oscillator 53C generates a third frequency signal fixed to a third frequency F3 (1000.5 MHz) phase-locked by the PLL circuit to the reference frequency signal $F_{REF}$ generated by the reference oscillator 11.

Further, a fourth oscillator 53D generates a fourth frequency signal fixed to a fourth frequency F4 (1010.5 MHz) phase-locked by the PLL circuit to the reference frequency signal $F_{REF}$ generated by the reference oscillator 11.

The switching circuit 54 alternately outputs four types of frequency signals with 1 GHz band input from the synthesizer circuit 53 via the isolators 57A, 57B, 57C, 57D from two output terminals by switching the frequency signals cyclically. In other words, the switching circuit 54 functions as a selector switch with four inputs and two outputs for cyclically switching the four types of frequency signals with 1 GHz band to be supplied to the first and second frequency converters 14A, 14B connected to the two output terminals.

Here, by inserting the isolators 57A, 57B, 57C, 57D between the synthesizer circuit 53 and the switching circuit 54, and by inputting the frequency signals from the synthesizer circuit 53 to the switching circuit 54 via the isolators 57A, 57B, 57C, 57D, an operation of a signal source is prevented from being unstable with a load fluctuation by an opening or a short-circuit of circuits in and after the switching circuit 54.

As the isolators 57A, 57B, 57C, 57D, a microwave amplifier with large reverse isolation, a Pi-pad attenuator or a T-pad attenuator, an isolation element such as a microwave isolator using ferrite, and an isolation circuit combining a variable attenuator and a band pass filter, or an isolation circuit combining an isolation amplifier and a resistance attenuator or a band pass filter, can be used.

And, the first and second frequency converters 14A, 14B obtain a first and second modulation signals Fma, Fmb, in which frequencies are converted to four types of modulation frequencies Fm1, Fm2, Fm3, Fm4 with 25 GHz band, from the frequency signal with a frequency F0 (for example, 24 GHz) supplied from the first oscillator 13 and the frequency signals with four types of frequencies F1, F2, F3, F4 with 1 GHz band alternately output from the switching circuit 54 by switching the frequency signals cyclically, and supply the modulation signals to the first and second optical frequency comb generators 15A, 15B as driving signals via band pass filters 16A, 16B.

In other words, the first and second frequency converters 14A, 14B function as up converters for converting the frequency signals with 1 GHz band to the first and second modulation signals Fma, Fmb with 25 GHz band to be supplied to the first and second optical frequency comb generators 15A, 15B as driving signals.

Here, the optical frequency comb generation device 50 generates two types of optical frequency combs as a reference light and a measuring light for performing an absolute distance measurement requiring a switching of frequencies in a three-dimensional profiler or an optical frequency comb distance meter described in Patent Document 1, Patent Document 2 and else, and, as indicated in Table 1, by supplying the first and second modulation signals Fma, Fmb obtained by cyclically switching the frequency signals with four types of frequencies F1, F2, F3, F4 with 1 GHz band by the switching circuit 54 and by up-converting to four types of modulation frequencies Fm1, Fm2, Fm3, Fm4 with 25 GHz band by the first and second frequency converters 14A, 14B to the first and second optical frequency comb generators 15A, 15B as the driving signals, two types of optical frequency combs with mutually different modulation cycles switched cyclically are output from the first and second optical frequency comb generators 15A, 15B.

TABLE 1

| Setting | OFCG1/OFCG2 | Phase difference |
|---|---|---|
| #1 | $f_m/(f_m + \Delta f)$ | $-2\pi f_m T$ |
| #2 | $(f_m + \Delta f_m)/(f_m + \Delta f_m + \Delta f)$ | $-2\pi(f_m + \Delta f_m)T$ |
| #3 | $(f_m + \Delta f)/f_m$ | $-2\pi(f_m + \Delta f)T$ |
| #4 | $(f_m + \Delta f_m + \Delta f)/(f_m + \Delta f_m)$ | $-2\pi(f_m + \Delta f_m + \Delta f)T$ |

Figure 9:
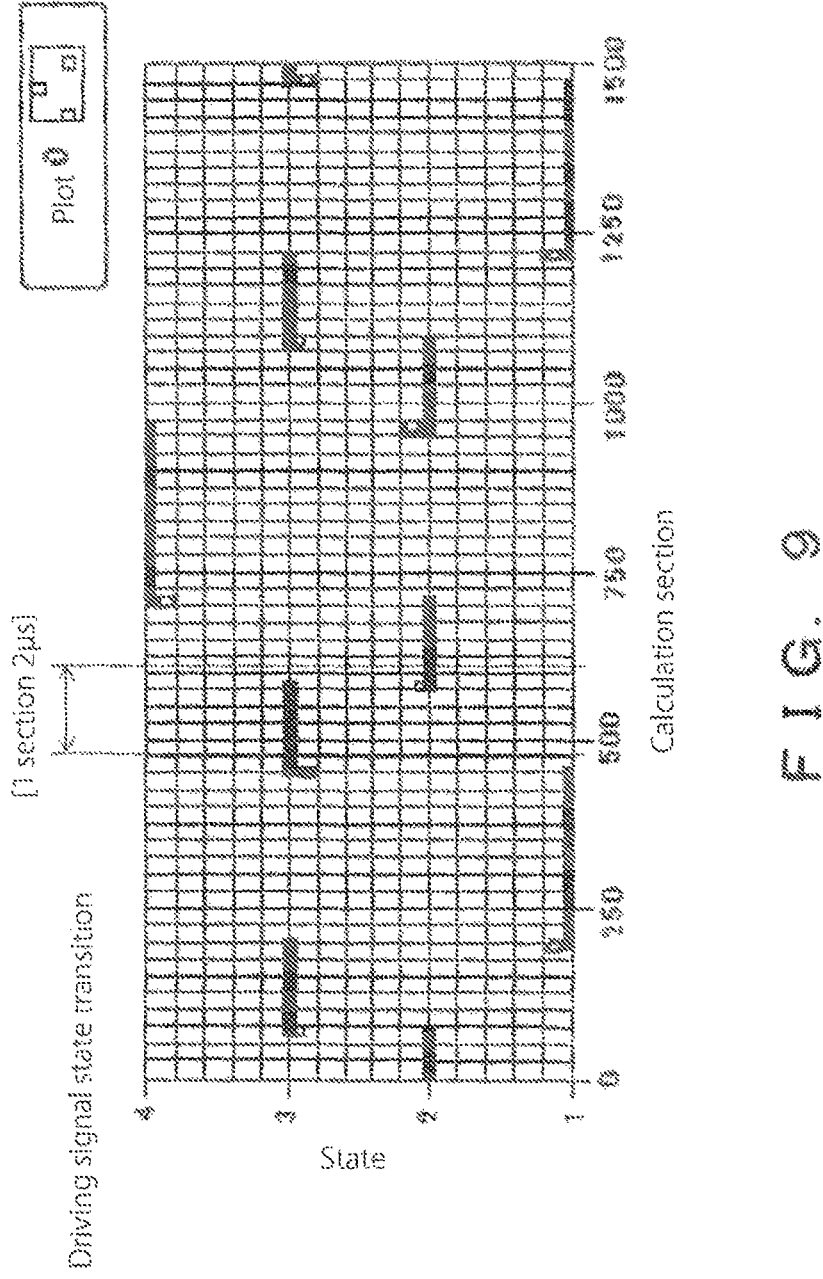
FIG. 9 is a state transition view illustrating a state transition of a driving signal supplied to two optical frequency comb generators in the optical frequency comb generation device.

Table 1 indicates a transition state OFCG1/OFCG2 of driving signals of the first and second optical frequency comb generators 15A, 15B in settings of #1 to #4 and its phase difference, and frequencies of driving signals are $\Delta f=500$ kHz, $\Delta fm=10$ MHZ, $fm=Fm1$ (25000 MHz), $fm+\Delta fm=Fm2$ (25010 MHZ), $fm+\Delta f=Fm3$ (25000.5 MHz), $fm+\Delta fm+\Delta f=Fm4$ (25010.5 MHz). FIG. 9 is a state transition chart illustrating a state transition of driving signals supplied to two optical frequency comb generators 15A, 15B in the optical frequency comb generation device 50.

Here, in the optical frequency comb distance meter, by using a reference light and a measuring light with coherence emitted from two optical frequency comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical frequency comb is defined as N, a phase difference of N-order mode of the reference signal and the measuring signal is calculated to offset an optical phase difference of an optical frequency comb production and transmission process from the optical frequency comb generators to a reference point, and then, a distance from the reference point to a measuring surface is calculated by determining a phase difference of signal pulses by calculating an increment of a phase difference per one order in a frequency axis.

In addition, when a measuring distance is beyond a half-wavelength of a modulation frequency fm, a distance of integral multiples of a half-wavelength will be unidentifiable due to a periodicity of an object light, and a distance cannot be determined uniquely, so measurements are performed four times by using the reference light and the measuring light in which modulation frequencies are set in four ways as indicated in Table 1, and in the signal processing unit, a distance beyond an ambiguity distance ($L_a=c/2fm$ c: light speed) corresponding to a half-wavelength is calculated by using each of phase difference obtained by performing same process.

In other words, a phase difference of the reference signal and the measuring signal obtained by measuring the modulation frequencies set in four ways as indicated in Table 1 will be: $-2\pi fmT$ in a setting of #1 in which modulation frequencies of modulation signals for driving two optical frequency comb generators (OFCG1, OFCG2) are fm and $fm+\Delta f$; $-2\pi(fm+\Delta fm)T$ in a setting of #2 in which the modulation frequencies of the modulation signals are $fm+\Delta fm$ and $fm+\Delta fm+\Delta f$; $-2\pi(fm+\Delta f)T$ in a setting of #3 in which the modulation frequencies of the modulation signals are fm+$\Delta$ f and fm; and $-2\pi$(fm+$\Delta$fm+$\Delta$f)T in a setting of #4 in which the modulation frequencies of the modulation signals are fm+$\Delta$fm+$\Delta$f and fm+$\Delta$fm.

When a distance ($L_a$=c/2fm c: light speed) is long, a phase difference ($-2\pi$fmT) of the reference signal and the measuring signal will be in a form of $\varphi$+2m$\pi$ wherein m is an integer, and $\varphi$ can be determined by calculation, but an integer value m is unidentifiable.

On the other hand, a difference between the phase difference $-2\pi$fmT of the reference signal and the measuring signal in the setting of #1 and the phase difference $-2\pi$(fm+$\Delta$fm)T of the reference signal and the measuring signal in the setting of #2 is $2\pi\Delta$fmT, and also, a difference between the phase difference $-2\pi$(fm+$\Delta$f)T of the reference signal and the measuring signal in the setting of #3 and the phase difference $-2\pi$(fm+$\Delta$fm+$\Delta$f)T of the reference signal and the measuring signal in the setting of #4 is $2\pi\Delta$fmT, and a phase will be determined uniquely until a distance (when $\Delta$fm=10 MHz, La is 15 m) corresponding to a half-wavelength of $\Delta$fm.

And, the integer m can be determined by comparing with the phase difference of #1 by multiplying this phase by fm/$\Delta$fm.

Further, $2\pi\Delta$f is obtained from a difference between the phase difference $-2\pi$fmT in the setting of #1 and the phase difference $-2\pi$(fm+$\Delta$f)T in the setting of #3.

Here, when fm=25 GHz, $\Delta$f=500 kHz, $\Delta$fm=10 MHz, as $\Delta$f=500 kHz, a distance measurement until La=300 m can be performed.

In an optical frequency comb distance meter mounting this optical frequency comb generation device 50, an absolute distance measurement is performed by using the reference signal and the measuring signal obtained by measuring with the modulation frequencies set in four ways as indicated in Table 1. In other words, after maintaining one state for a certain time, it will be transit to other state, and a signal phase measurement of the state is performed at a certain period, and a calculation process of an absolute distance is performed by using phases of setting states of #1, #2, #3, #4.

A measurement speed in the optical frequency comb distance meter is 500 kHz as equal to $\Delta$f in a relative distance measurement within 6 mm, but in an absolute distance measurement requiring a switching of frequencies, it will be a time including a frequency switching time and an absolute distance calculation time.

In the optical frequency comb generation device 50, as the isolators 57A, 57B, 57C, 57D are inserted between the synthesizer circuit 53 and the switching circuit 54, an operation of the synthesizer circuit 53 will not be unstable by a load fluctuation at the moment when switching the frequency signals with four types of frequencies F1, F2, F3, F4 cyclically by the switching circuit 54, and a driving state of the optical frequency comb generators 15A, 15B can be transit by switching driving signals of the optical frequency comb generators 15A, 15B rapidly. In other words, a driving state of the first and second optical frequency comb generators 15A, 15B can be transit rapidly by switching the four types of modulation frequencies Fm1, Fm2, Fm3, Fm4 by the switching circuit 54, and a measuring time of an absolute distance can be shortened by using as two optical frequency comb light sources for performing absolute distance measurement by switching modulation frequencies of the reference signal and the measuring signal.

In addition, when performing a distance measurement only, it can be performed by the settings of #1 and #2 only, or by the settings of #3 and #4 only, but by the settings of

1, #2, #3, #4 as the above, in other words, by switching the four types of modulation frequencies Fm1, Fm2, Fm3, Fm4 cyclically by the switching circuit 54, an absolute distance measurement result with high accuracy can be obtained by reducing a phase offset according to a signal transmission path of a distance other than a distance to be measured. In other words, when switching modulation frequencies of two optical frequency comb generators (OFCG1, OFCG2), in a phase derived from a distance to be measured, an absolute value will not be changed, but a sign will be inversed. On the other hand, in an offset derived from a length of a cable of an interference signal transmission path, a sign will not be changed and will be a constant value. Therefore, a phase value excluding an offset can be determined by subtracting results of two phase measurements and dividing by two.

Here, in the optical frequency comb generation device 50, by inserting the isolators 57A, 57B, 57C, 57D between the synthesizer circuit 53 and the switching circuit 54 as the above, an operation of the synthesizer circuit 53 is prevented from being unstable with a load fluctuation at the moment when switching the frequency signals with the four types of frequencies F1, F2, F3, F4 cyclically by the switching circuit 54, but at the time of switching operation of the switching circuit 54, the circuit is cutoff every time for extremely short time, and no modulation state occurs.

Here, in the optical frequency comb generation device 50, respective optical frequency combs emitted from the first and second optical frequency comb generators 15A, 15B are separated by couplers 4A, 4B, and a part of respective optical frequency combs are incident on optical frequency comb generator control devices 10A, 10B, and in this way, a resonator length of respective optical resonators comprised in the first and second optical frequency comb generators 15A, 15B is feedback controlled.

As the optical frequency comb generator control devices 10A, 10B, the optical frequency comb generator control device 10 applied to the optical frequency comb generation device 3 illustrated in a block diagram of FIG. 3 is used.

Figure 11:
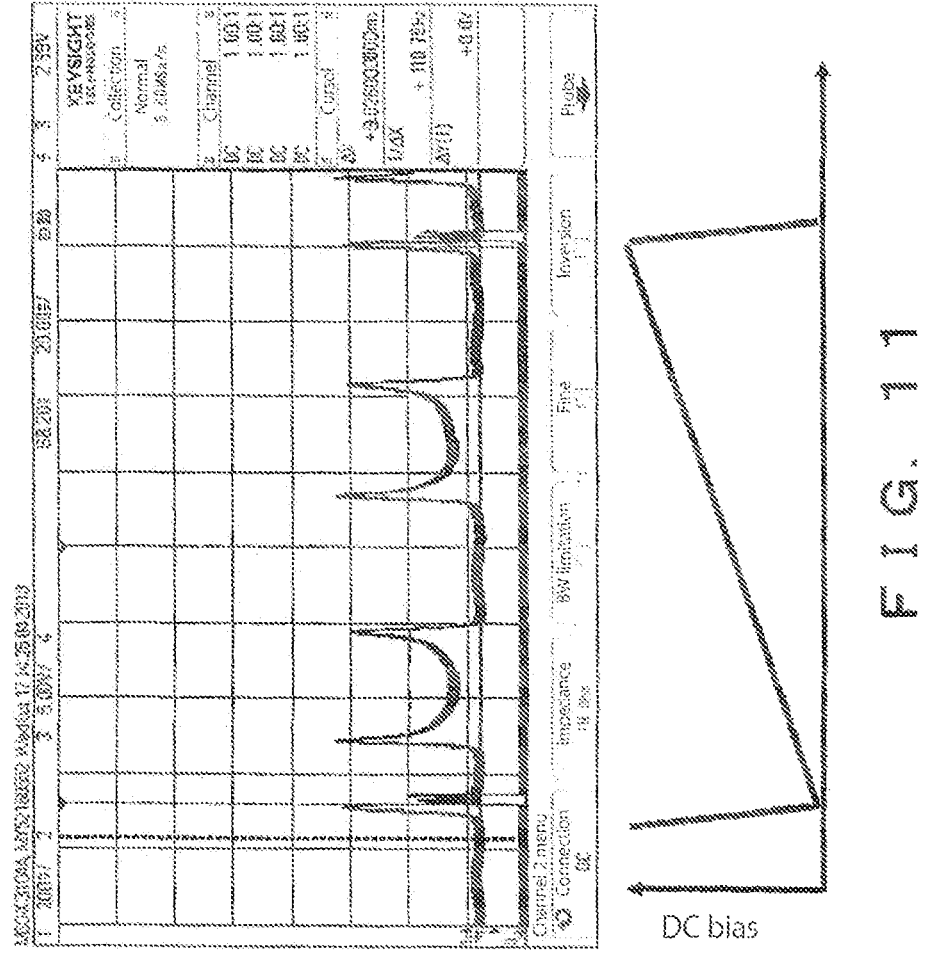
FIG. 11 is a view illustrating an observation result of a detection signal obtained by a photodetector receiving an optical frequency comb output via an optical filter by driving an optical frequency comb generator by the driving signal.

About a detection signal obtained by the photodetector 6 by driving the optical frequency comb generator 2 by a driving signal supplied to the first optical frequency comb generator 15A, in a state that an incident light with a frequency of 192.8 THz is entered from the light source 1 in the optical frequency comb generation device 3 to the optical frequency comb generator 2, a frequency component lower than a frequency of a switching operation of the switching circuit 54 was observed via a low pass filter, and in a state that the optical filter 5 is not inserted before the photodetector 6, as illustrated in FIG. 10, an occurrence of small peak in a middle of double peaks is confirmed, and in this state, it will hinder a resonant control when a SW transition is proceeded continuously, but in a state that the optical filter 5 is inserted before the photodetector 6, as illustrated in FIG. 11, an occurrence of small peak in a middle of double peaks is not confirmed, and a stable resonant control can be performed when a SW transition is proceeded continuously.

As a WDM filter with a bandwidth of 100 GHz in which a CH number is defined at an interval of 100 GHz with a center of 190 THz for WDM is commercially available, WDN filters of CH27 (192.7 THz, 1555.75 nm), CH28 (192.8 THz, 1554.94 nm), CH29 (192.9 THz, 1555.75 nm), and CH30 (193.0 THz, 1553.33 nm) were tested as the optical filter 5, and in the WDM filters other than CH28 (192.8 THz, 1554.94 nm) of input laser wavelength, a small peak at the time of SW transition is disappeared, and a resonant length of the optical resonator 21 can be locked by adding a dither. Also, there was no problem in a transmissive mode when a switch selection is fixed.

In addition, a signal level of a transmissive mode is decreased, but this is because a bandwidth of the WDM filter used as the optical filter 5 is narrow. In the optical filter 5, a band may be wide as long as it is having a characteristic excluding a wavelength near a wavelength of an input laser. Also, it may be a notch filter as long as it is having a characteristic excluding a wavelength near a wavelength of an input laser.

Figure 13A:
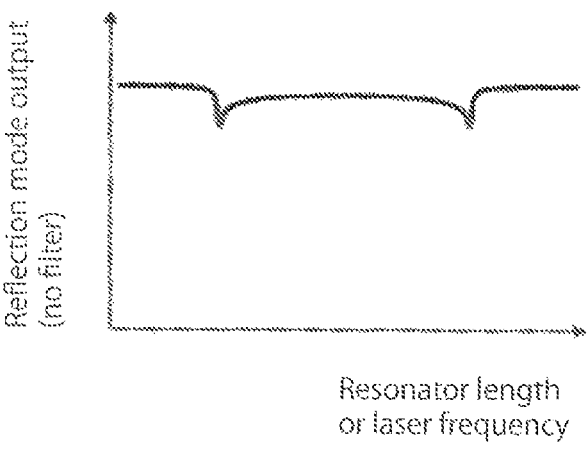
FIG. 13(A) and FIG. 13(B) are characteristic charts of an optical output power of a reflection mode obtained via an optical filter and an optical output power of a reflection mode of an optical frequency comb generator.
Figure 13B:
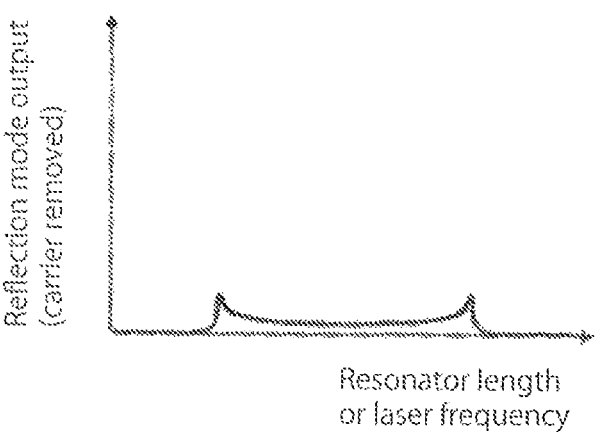

Here, FIG. 12(A) and FIG. 12(B) are block diagrams schematically illustrating examples of an optical frequency comb generation device. Also, FIG. 13(A) and FIG. 13(B) are characteristic charts of an optical output power of a reflection mode obtained via an optical filter and an optical output power of a reflection mode of an optical frequency comb generator. In other words, as the optical frequency comb generator 2 in the optical frequency comb generation device 3, other than an optical frequency comb generator for emitting an optical frequency comb from the optical resonator 21 as a transmitted light, as an optical frequency comb generator 2B illustrated in FIG. 12(A), an optical frequency comb generator for extracting an optical frequency comb from the optical resonator 21 as a reflected light via a coupler 4C, or a ring type optical frequency comb generator 2C illustrated in FIG. 12(B) can be adopted. In these types, a carrier component not coupling with the optical resonator will be high, and when an average value of an output power is measured, it will be a characteristic as illustrated in FIG. 13(A) with a resonator length or a laser frequency as a traverse axis. Even in this case, an output to be measured will be as FIG. 13(B) by using the optical filter 5 for removing a carrier and a signal similar as the above can be obtained. Also, a modulation system may be a system using an electrooptical modulation, or using a Kerr effect, and it may be various systems, but the present invention can be applied to various types of optical frequency comb generators regardless of a modulation system.

Next, explaining about an optical frequency comb generator control device 110A relating to the present invention for controlling an optical frequency comb resonator length by using an optical frequency comb emitted from the optical frequency comb generator 2 as a transmitted light, by using a block diagram of FIG. 14.

The optical frequency comb generator control device 110A illustrated in FIG. 14 comprises: a first photodetector 116A for receiving a part of a light beam incident on an optical frequency comb generator 2 from a light source 1 of an optical frequency comb generation device 3A via an incident side coupler 114A for branching the light beam; an optical filter 5 to which a part of an optical frequency comb emitted from the optical frequency comb generator 2 as a transmitted light is entered by branching the optical frequency comb via an emission side coupler 114B; and a second photodetector 116B for receiving a part of the optical frequency comb via the optical filter 5.

In the optical frequency comb generator control device 110A, a resonator length of the optical frequency comb generator 2 is controlled using a resonator length control signal $S_{CTL}$ generated by a control signal generation unit 123A by controlling a frequency difference of modes of an optical resonator and a laser frequency of the optical frequency comb generator 2 by modulating a light source frequency of the light source 1 using a modulation signal $S_D$ generated by an oscillator 122 of a resonance control unit 120A.

The first photodetector 116A obtains an incident light detection signal $S_A$ indicating an optical intensity A of a light beam emitted from the light source 1 and entering the optical frequency comb generator 2 by receiving a part of the light beam via the incident side coupler 114A, and this incident light detection signal $S_A$ is supplied to a lock-in amplifier 121 of the resonance control unit 120A.

Also, the second photodetector 116B obtains an emission light detection signal $S_B$ indicating an optical intensity B of an optical frequency comb emitted from the optical frequency comb generator 2 as a transmitted light by receiving a part of the optical frequency comb via the emission side coupler 114B, and this emission light detection signal $S_B$ is supplied to the lock-in amplifier 121.

Figures 15A, 15B:
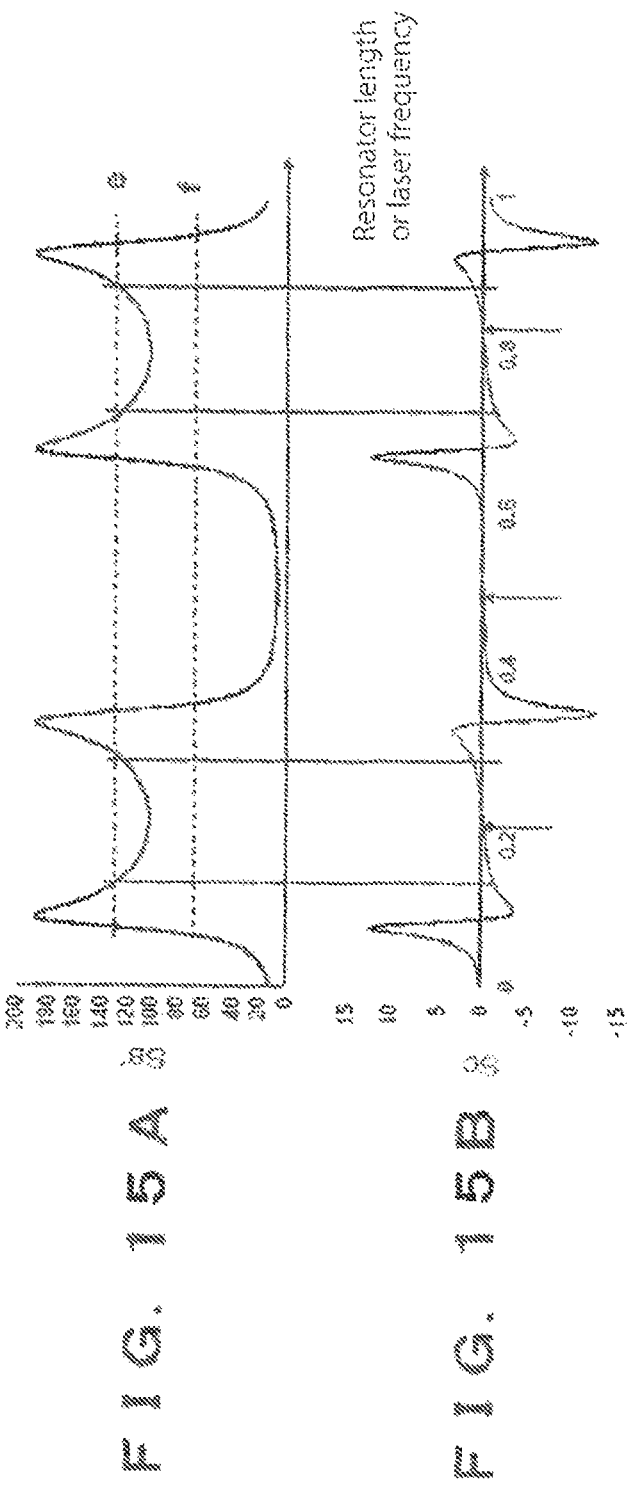
FIG. 15(A) and FIG. 15(B) are waveform charts for explaining an operation of a lock-in amplifier of the optical frequency comb generator control device.

FIG. 15(A) and FIG. 15(B) are waveform charts for explaining an operation of the lock-in amplifier 121 of the optical frequency comb generator control device 110A. In other words, in the resonance control unit 120A in the optical frequency comb generator control device 110A, an optical intensity A of the light beam emitted from the light source 1 of the optical frequency comb generation device 3A changes by a modulation input or an environmental change, so in order to eliminate its influence from the signal, by making B'=B/A with digital processing or the like with respect to the optical intensity A of the light beam indicated by the incident light detection signal $S_A$ and the optical intensity B of the optical frequency comb indicated by the emission light detection signal $S_B$, by the lock-in amplifier 121, an optical intensity signal $S_B''$ indicating an optical intensity B' of an optical frequency comb not depending on a power change of an input light is obtained as illustrated in FIG. 15(A), and a differential signal $S_C$ of the optical intensity signal $S_B$ indicating the optical intensity B' of the optical frequency comb is output as illustrated in FIG. 15(B), based on a synchronization signal given by the oscillator 122 generating an modulation signal $S_D$ for modulating a light source frequency of the light source 1 of the optical frequency comb generation device 3A.

As illustrated in FIG. 15(B), in the differential signal $S_C$, a sign inversion occurs at a bottom position of the optical intensity signal $S_{B'}$ indicating the optical intensity B' of the optical frequency comb illustrated in FIG. 15(A).

And, the control signal generation unit 123A judges a range including a bottom between double peaks generating an optical frequency comb efficiently in the optical intensity signal $S_{B'}$ indicating the optical intensity B' of the optical frequency comb from a previously defined range of e-f illustrated in FIG. 15(A), determines a sign inversion point coinciding with a point for generating an optical frequency comb efficiently from a plurality of sign inversion points in the differential signal $S_C$, generates a resonator length control signal $S_{CTL}$ for controlling a resonator length of the optical frequency comb generator 2 to be the sign inversion point, and controls a resonator length of the optical frequency comb generator 2 by the resonator length control signal $S_{CTL}$. In other words, the control signal generation unit 123A is having a function of the bottom position discriminator 7, and performs a feedback control with a bottom position of a signal level of the optical intensity signal $S_{B'}$ indicating the optical intensity B' of the optical frequency comb as a stabilization point. A feedback control of a resonator length of the optical frequency comb generator 2 by the control signal generation unit 123A may have a stabilization point in which an offset is given based on the bottom position of the signal level of the optical intensity signal $S_B$ indicating the optical intensity B' of the optical frequency comb.

In addition, here, a frequency difference of modes of an optical resonator and a laser frequency of the optical frequency comb generator 2 is controlled by a resonator length control by modulating a light source frequency of the light source 1 using the modulation signal $S_D$, but a resonator length control of the optical frequency comb generator 2 may be performed, for example by changing a DC bias via a bias T of a modulation input of an optical frequency comb module.

Next, explaining about an optical frequency comb generator control device 110B relating to the present invention for controlling a light source frequency by using an optical frequency comb emitted from the optical frequency comb generator 2 as a transmitted light, by using a block diagram of FIG. 16.

An optical frequency comb generator control device 110B illustrated in FIG. 16 controls a light source frequency of the light source 1 by obtaining a resonance control signal $S_{CTF}$ for controlling a frequency difference of modes of an optical resonator and a laser frequency of the optical frequency comb generator 2 by controlling a light source frequency of the light source 1 of the optical frequency comb generation device 3A by a control signal generation unit 123B, instead of the control signal generation unit 123A for generating the resonator length control signal $S_{CTL}$ in the optical frequency comb generator control device 110A.

In addition, in the optical frequency comb generator control device 110B, the components identical with the optical frequency comb generator control device 110A are given identical reference numbers in FIG. 16, and detailed explanations thereof are omitted.

A resonance control unit 120B of the optical frequency comb generator control device 110B obtains an optical intensity signal $S_B$ indicating an optical intensity B' of an optical frequency comb not depending on a power change of an input light as illustrated in FIG. 15(A), from an incident light detection signal $S_A$ obtained by the first photodetector 116A and an emission light detection signal $S_B$ obtained by the second photodetector 116B, by the lock-in amplifier 121, and outputs a differential signal $S_C$ of the optical intensity signal $S_{B'}$ indicating the optical intensity B' of the optical frequency comb as illustrated in FIG. 15(B).

And, the control signal generation unit 123B judges a range including a bottom between double peaks generating an optical frequency comb efficiently in the optical intensity signal $S_{B'}$ indicating the optical intensity B' of the optical frequency comb from a previously defined range of e-f illustrated in FIG. 15(A), determines a sign inversion point coinciding with a point for generating an optical frequency comb efficiently from a plurality of sign inversion points in the differential signal $S_C$, generates a resonance control signal $S_{CTF}$ for controlling a light source frequency of the light source 1 to be the sign inversion point, and feedback controls a light source frequency of the light source 1 by adding the resonance control signal $S_{CTF}$ by an adder 124 to the modulation signal $S_D$ for modulating a light source frequency of the light source 1 generated by the oscillator 122. In other words, the control signal generation unit 123B is having a function of the bottom position discriminator 7, and performs a feedback control with a bottom position of a signal level of the optical intensity signal $S_{B'}$ indicating the optical intensity B' of the optical frequency comb as a stabilization point.

Next, explaining about an optical frequency comb generator control device 110C relating to the present invention in which an optical frequency comb resonator length is controlled using an optical frequency comb emitted from an optical frequency comb generator 2B as a reflected light, by using a block diagram of FIG. 17.

An optical frequency comb generator control device 110C illustrated in FIG. 17 branches an optical frequency comb emitted as a reflected light from the optical frequency comb generator 2B of an optical frequency comb generation device 3B by an incident side coupler 114 and makes the second photodetector 116B to receive a part of the optical frequency comb via the optical filter 5, instead of an emission side coupler 114B for branching an optical frequency comb emitted as a transmitted light from the optical frequency comb generator 2 of the optical frequency comb generation device 3A in the optical frequency comb generator control device 110A and making the second photodetector 116B to receive a part of the optical frequency comb via the optical filter 5.

In addition, in the optical frequency comb generator control device 110C, the components identical with the optical frequency comb generator control device 110A are given identical reference numbers in FIG. 17, and detailed explanations thereof are omitted.

In the optical frequency comb generator control device 110C, the incident side coupler 114 comprised in the optical frequency comb generation device 3B is having a function to branch an optical frequency comb emitted as a reflected light from the optical frequency comb generator 2B and to make the second photodetector 116B to receive a part of the optical frequency comb emitted as the reflected light via the optical filter 5, and also, to branch a light beam incident on the optical frequency comb generator 2B from the light source 1 and to make the first photodetector 116A to receive a part of the light beam.

In a resonance control unit 120C in the optical frequency comb generator control device 110C, by making B'=B/A with digital processing or the like with respect to the optical intensity A of the light beam indicated by an incident light detection signal $S_A$ obtained by the first photodetector 116A and an optical intensity B of an optical frequency comb indicated by a reflection light detection signal $S_B$ obtained by the second photodetector 116B, by the lock-in amplifier 121, an optical intensity signal $S_{B'}$ indicating an optical intensity B' of an optical frequency comb not depending on a power change of an input light is obtained as illustrated in FIG. 15(A), and a differential signal $S_C$ of the optical intensity signal $S_{B'}$ indicating the optical intensity B' of the optical frequency comb is output as illustrated in FIG. 15(B), based on a synchronization signal given by the oscillator 122 generating an modulation signal $S_D$ for modulating a light source frequency of the light source 1 of the optical frequency comb generation device 3B.

And, the control signal generation unit 123C judges a range including a bottom between double peaks generating an optical frequency comb efficiently in the optical intensity signal $S_{B'}$ indicating the optical intensity B' of the optical frequency comb from a previously defined range of e-f illustrated in FIG. 15(A), determines a sign inversion point coinciding with a point for generating an optical frequency comb efficiently from a plurality of sign inversion points in the differential signal $S_C$, generates a resonator length control signal $S_{CTL}$ for controlling a resonator length of the optical frequency comb generator 2B to be the sign inversion point, and feedback controls a resonator length of the optical frequency comb generator 2B by the resonator length control signal $S_{CTL}$. In other words, the control signal generation unit 123C is having a function of the bottom position discriminator 7, and performs a feedback control with a bottom position of a signal level of the optical intensity signal $S_{B'}$ indicating the optical intensity B' of the optical frequency comb as a stabilization point.

Figure 18:
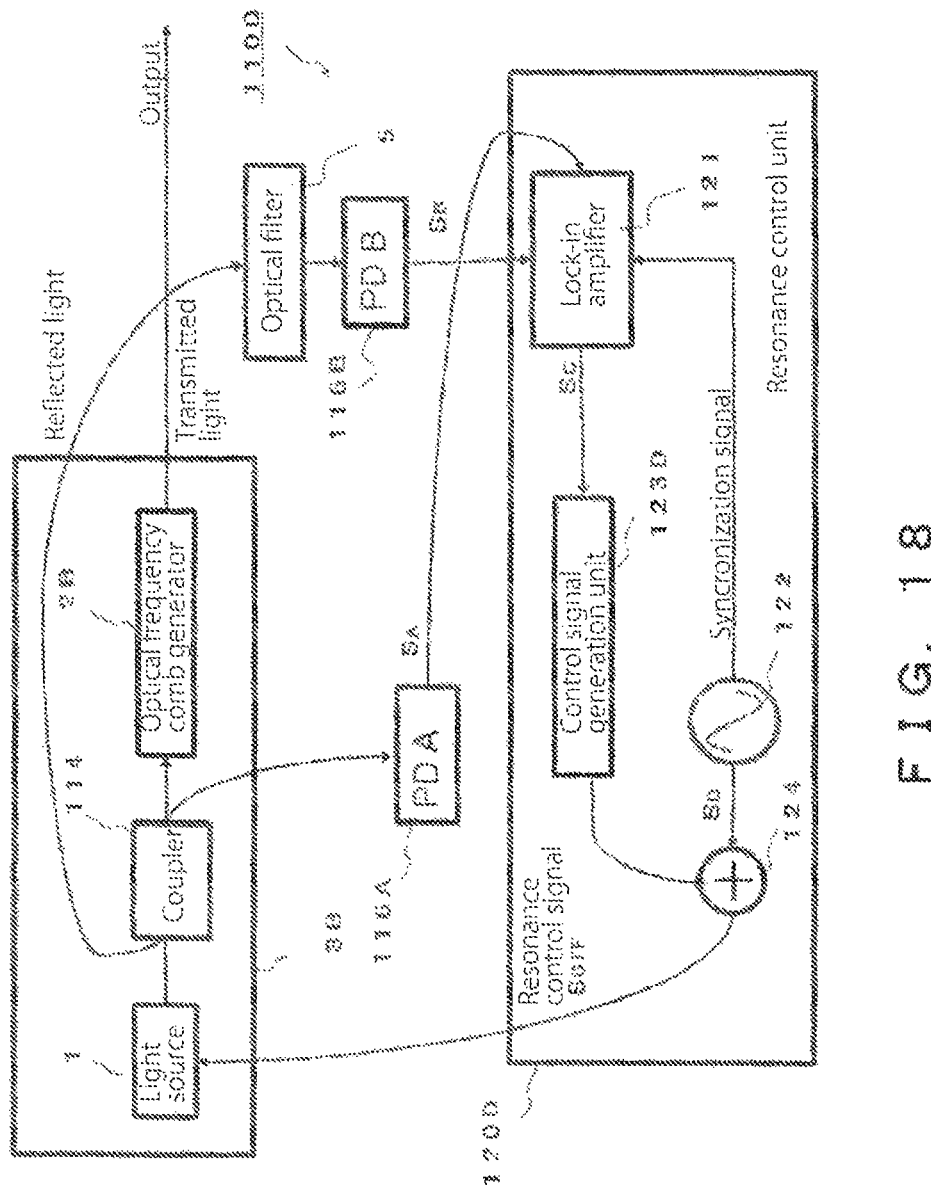
FIG. 18 is a block diagram illustrating other example of an optical frequency comb generator control device in which an optical frequency comb resonator length is controlled using an optical frequency comb emitted from an optical frequency comb generator as a reflected light.

Further, explaining about an optical frequency comb generator control device 110D relating to the present invention in which a laser frequency is controlled using an optical frequency comb emitted from an optical frequency comb generator 2B as a reflected light, by using a block diagram of FIG. 18.

An optical frequency comb generator control device 110D illustrated in FIG. 18 controls a light source frequency of the light source 1 by obtaining a resonance control signal $S_{CTF}$ for controlling a frequency difference of modes of an optical resonator and a laser frequency of the optical frequency comb generator 2 by controlling a light source frequency of the light source 1 of the optical frequency comb generation device 3B by a control signal generation unit 123D, instead of the control signal generation unit 123C for generating the resonator length control signal $S_{CTL}$ in the optical frequency comb generator control device 110C.

In addition, in the optical frequency comb generator control device 110D, the components identical with the optical frequency comb generator control device 110C are given identical reference numbers in FIG. 18, and detailed explanations thereof are omitted.

A resonance control unit 120D of the optical frequency comb generator control device 110D obtains an optical intensity signal $S_{B'}$ indicating an optical intensity B' of an optical frequency comb not depending on a power change of an input light as illustrated in FIG. 15(A), from an incident light detection signal $S_A$ obtained by the first photodetector 116A and a reflection light detection signal $S_B$ obtained by the second photodetector 116B, by the lock-in amplifier 121, and outputs a differential signal $S_C$ of the optical intensity signal $S_{B'}$ indicating the optical intensity B' of the optical frequency comb as illustrated in FIG. 15(B).

And, the control signal generation unit 123D judges a range including a bottom between double peaks generating an optical frequency comb efficiently in the optical intensity signal $S_{B'}$ indicating the optical intensity B' of the optical frequency comb from a previously defined range of e-f illustrated in FIG. 15(A), determines a sign inversion point coinciding with a point for generating an optical frequency comb efficiently from a plurality of sign inversion points in the differential signal $S_C$, generates a resonance control signal $S_{CTF}$ for controlling a light source frequency of the light source 1 to be the sign inversion point, and feedback controls a light source frequency of the light source 1 by adding the resonance control signal $S_{CTF}$ by an adder 124 to the modulation signal $S_D$ for modulating a light source frequency of the light source 1 generated by the oscillator 122. In other words, the control signal generation unit 123D is having a function of the bottom position discriminator 7, and performs a feedback control with a bottom position of a signal level of the optical intensity signal $S_{B'}$ indicating the optical intensity B' of the optical frequency comb as a stabilization point.

GLOSSARY OF DRAWING REFERENCES

1 Light source
2, 2A, 2B, 2C Optical frequency comb generator
3, 3A, 3B Optical frequency comb generation device
4, 4A, 4B, 114A, 114B Coupler
5 Optical filter
6, 116A, 116B Photodetector
7 Bottom position discriminator
8, 120A, 120B, 120C, 120D Resonance control unit 10, 10A, 10B, 110A, 110B, 110C, 110D Optical frequency comb generator control device
11 Reference oscillator
12, 52 Power divider
13, 53A, 53B, 53C, 53D Oscillator
14A, 14B Frequency converter
15A, 15B Optical frequency comb generator
16A, 16B Band pass filter
17A, 17B, 57A, 57B, 57C, 57D Isolator
21 Optical resonator
21A, 21B Reflecting mirror
22 Optical phase modulator
53 Synthesizer circuit
54 Switching circuit
121 Lock-in amplifier
122 Oscillator
123A, 123B, 123C, 123D Control signal generation unit
124 Adder

The invention claimed is:

1. A control device of an optical frequency comb generator comprising an optical modulator for performing an optical modulation of incident light in an optical resonator, the optical frequency comb generator control device comprising:
an optical filter for attenuating a carrier frequency component of an optical frequency comb emitted as a transmitted light or a reflected light from the optical resonator;
a photodetector for detecting an optical intensity by receiving an optical frequency component extracted from the optical frequency comb via the optical filter;
a resonance control unit to which a detection signal of the photodetector is supplied; and
a bottom position discriminator for discriminating a bottom position of a signal level of the detection signal of the photodetector,
wherein an optical intensity of the optical frequency comb in which the carrier frequency component is attenuated by the optical filter is detected by the photodetector, and an optical resonant length of the optical resonator or a light source frequency of the incident light is feedback controlled by the resonance control unit, and wherein the resonance control unit performs a feedback control with the bottom position of the signal level of the detection signal of the photodetector as a basis of a stabilization point, based on a discrimination output by the bottom position discriminator.

2. The optical frequency comb generator control device according to claim 1, wherein a plurality of modulation signals with different modulation frequencies are switched and supplied to the optical modulator.

3. The optical frequency comb generator control device according to claim 1, wherein the optical filter is a notch filter for attenuating the carrier frequency component of the optical frequency comb.

4. The optical frequency comb generator control device according to claim 1, wherein the optical filter is a high pass filter having a cutoff frequency near the carrier frequency component of the optical frequency comb.

5. The optical frequency comb generator control device according to claim 1, wherein the optical filter is a low pass filter having a cutoff frequency near the carrier frequency component of the optical frequency comb.

6. The optical frequency comb generator control device according to claim 1, wherein the optical filter is a band pass filter having one cutoff frequency near the carrier frequency component of the optical frequency comb.

\* \* \* \* \*